(12) United States Patent
Toyooka

(10) Patent No.: US 7,847,888 B2
(45) Date of Patent: Dec. 7, 2010

(54) LIQUID CRYSTAL DISPLAY DEVICE INCLUDING PROTECTIVE FILMS HAVING PREDETERMINED MOISTURE PERMEABILITY CHARACTERISTICS

(75) Inventor: Kentarou Toyooka, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 337 days.

(21) Appl. No.: 12/073,446

(22) Filed: Mar. 5, 2008

(65) Prior Publication Data

US 2008/0218666 A1  Sep. 11, 2008

(30) Foreign Application Priority Data

Mar. 8, 2007  (JP) .............................. 2007-058997

(51) Int. Cl.
G02F 1/1335 (2006.01)
G02F 1/1333 (2006.01)

(52) U.S. Cl. .............................. 349/96; 349/87; 349/117

(58) Field of Classification Search .................. 349/96, 349/87, 117
See application file for complete search history.

(56) References Cited

U.S. PATENT DOCUMENTS

| | | | |
|---|---|---|---|
| 6,831,713 B2 * | 12/2004 | Sugino et al. | 349/96 |
| 6,840,635 B2 * | 1/2005 | Maeda et al. | 359/512 |
| 6,961,178 B2 * | 11/2005 | Sugino et al. | 359/485 |
| 7,504,139 B2 * | 3/2009 | Kawanishi et al. | 428/1.54 |
| 7,505,100 B2 * | 3/2009 | Ito | 349/117 |
| 2007/0222920 A1 * | 9/2007 | Oka | 349/96 |
| 2008/0204643 A1 * | 8/2008 | Sasada | 349/117 |
| 2008/0218671 A1 * | 9/2008 | Nakamura | 349/117 |
| 2009/0251643 A1 * | 10/2009 | Yamada et al. | 349/96 |

FOREIGN PATENT DOCUMENTS

| | | | |
|---|---|---|---|
| JP | 2005-309394 A | | 11/2005 |
| JP | 2005309394 A | * | 11/2005 |

* cited by examiner

Primary Examiner—Mike Qi
(74) Attorney, Agent, or Firm—Buchanan Ingersoll & Rooney PC

(57) ABSTRACT

The present invention provides a liquid crystal display device containing: a liquid crystal cell; a backlight; a first polarizing plate disposed between the liquid crystal cell and the backlight and having a polarizer and at least two protective films disposed so as to sandwich the polarizer; and a second polarizing plate disposed on a side of the liquid crystal cell opposite to a side on which the first polarizing plate is provided and having a polarizer and at least two protective films disposed so as to sandwich the polarizer, wherein a moisture permeability of the protective films on both sides of the first polarizing plate at 60° C. and 95% RH is more than 300 g/m²·day, and a moisture permeability of at least one protective film of the second polarizing plate at 60° C. and 95% RH is equal to or less than 300 g/m²·day.

9 Claims, 2 Drawing Sheets

LIQUID CRYSTAL DISPLAY DEVICE INCLUDING PROTECTIVE FILMS HAVING PREDETERMINED MOISTURE PERMEABILITY CHARACTERISTICS

BACKGROUND OF THE INVENTION

1. Field of the Invention

The present invention relates to a liquid crystal display device in which at least one polarizing plate having a polarizer is disposed at one side and the other side of a liquid crystal cell.

2. Description of the Related Art

A strong dependence of image on a viewing angle has been a significant drawback of liquid crystal display devices, but the application of such devices as space-saving image display devices with low power consumption has still been widening year after year. In particular, in recent years, a high viewing-angle liquid-crystal mode such as a VA mode and an IPS mode has found practical use, and the demand for liquid crystal display devices has been rapidly growing even in the markets requiring a high viewing angle, such as television set market.

Accordingly, a demand has been created for even higher performance of polarizing plates that are employed in liquid crystal display devices.

Among the properties representing the required high performance, the improvement of endurance with respect to temperature and moisture is particularly important for polarizing plates.

Polarizing plates are usually manufactured by causing the adsorption of iodine in a hydrophilic polymer film such as a poly(vinyl alcohol) film, a partially formalized poly(vinyl alcohol) film, and a partially saponified film of ethylene-vinyl acetate copolymer and stretching the film. However, the problem associated with such polarizing plates is that light leak occurs on the circumference of a panel due to changes in the temperature and moisture of the environment. Shrinkage and relaxation of the stretched hydrophilic polymer is the reason for such light leak, and the light leak is known to be greatly affected by the amount of moisture transmitted from the outside through a protective film.

A method has been disclosed by which a polarizing plate is fabricated by pasting a protective film with a low moisture permeability onto a polarizer to resolve the above-described problem (see Japanese Patent Application Laid-Open (JP-A) No. 2005-309394).

However, in a polarizing plate using a protective film with a low moisture permeability, the process of pasting the protective films so as to sandwich the polarizer and then drying the moisture requires time when a poly(vinyl alcohol) polarizer (sometimes referred to hereinbelow as a polarization film) is employed. The resultant problem is that the productivity of polarizing plates using protective films on both surfaces and employing the conventional cellulose acylate films that have high moisture permeability is low and the production cost is thereby increased.

BRIEF SUMMARY OF THE INVENTION

The present invention resolves the above-described problems inherent to the related art and attains the below-described object. Thus, it is an object of the present invention to reduce the problems associated with light leak caused by changes in temperature and moisture environment and to provide a liquid crystal display device with high display quality.

The inventors have conducted a comprehensive study aimed at the resolution of the above-described problems and have gained the following knowledge. Thus, in order to improve the durability of a polarizing plate under high-moisture conditions, prevent the occurrence of problems such as light leak, and realize high display quality, it is important that the moisture permeability of the protective film of the polarizing plate at the viewing side that is in contact with the air be equal to or less than 300 g/m$^2$·day. On the other hand, because the polarizing plate on the backlight side does not come into contact with the air, variations in moisture environment therein are small and it is not necessary to use a protective film with a low moisture permeability such as that for the polarizing plate on the viewing side. In order to reduce cost, it is rather preferred that a polarizing plate bonded to a protective film with a high moisture permeability that can be manufactured with high productivity be used for the polarizing plate on the backlight side. The above-described findings enable the resolution of the above-described problems.

It has also been found that the brightness and contrast are increased and the above-described problems can be resolved by decreasing the retardation of the protective film provided at the polarizing plate on the backlight side, or by directly using a film that increases brightness as the protective film for the polarizing plate.

The present invention is achieved based upon the knowledge of the present inventors, and means for solving the problems are as follows.

Namely, the a liquid crystal display device of the present invention contains: a liquid crystal cell; a backlight; a first polarizing plate disposed between the liquid crystal cell and the backlight and having a polarizer and at least two protective films disposed so as to sandwich the polarizer; and a second polarizing plate disposed on a side of the liquid crystal cell opposite to a side on which the first polarizing plate is provided and having a polarizer and at least two protective films disposed so as to sandwich the polarizer, wherein a moisture permeability of the protective films on both sides of the first polarizing plate at a temperature of 60° C. and a relative humidity of 95% is more than 300 g/m$^2$·day, and a moisture permeability of at least one protective film of the second polarizing plate at a temperature of 60° C. and a relative humidity of 95% is equal to or less than 300 g/m$^2$·day.

DETAILED DESCRIPTION OF THE INVENTION

A liquid crystal display device in accordance with the present invention will be described below in greater detail.

(Liquid Crystal Display Device)

<Configuration>

Figure 1:
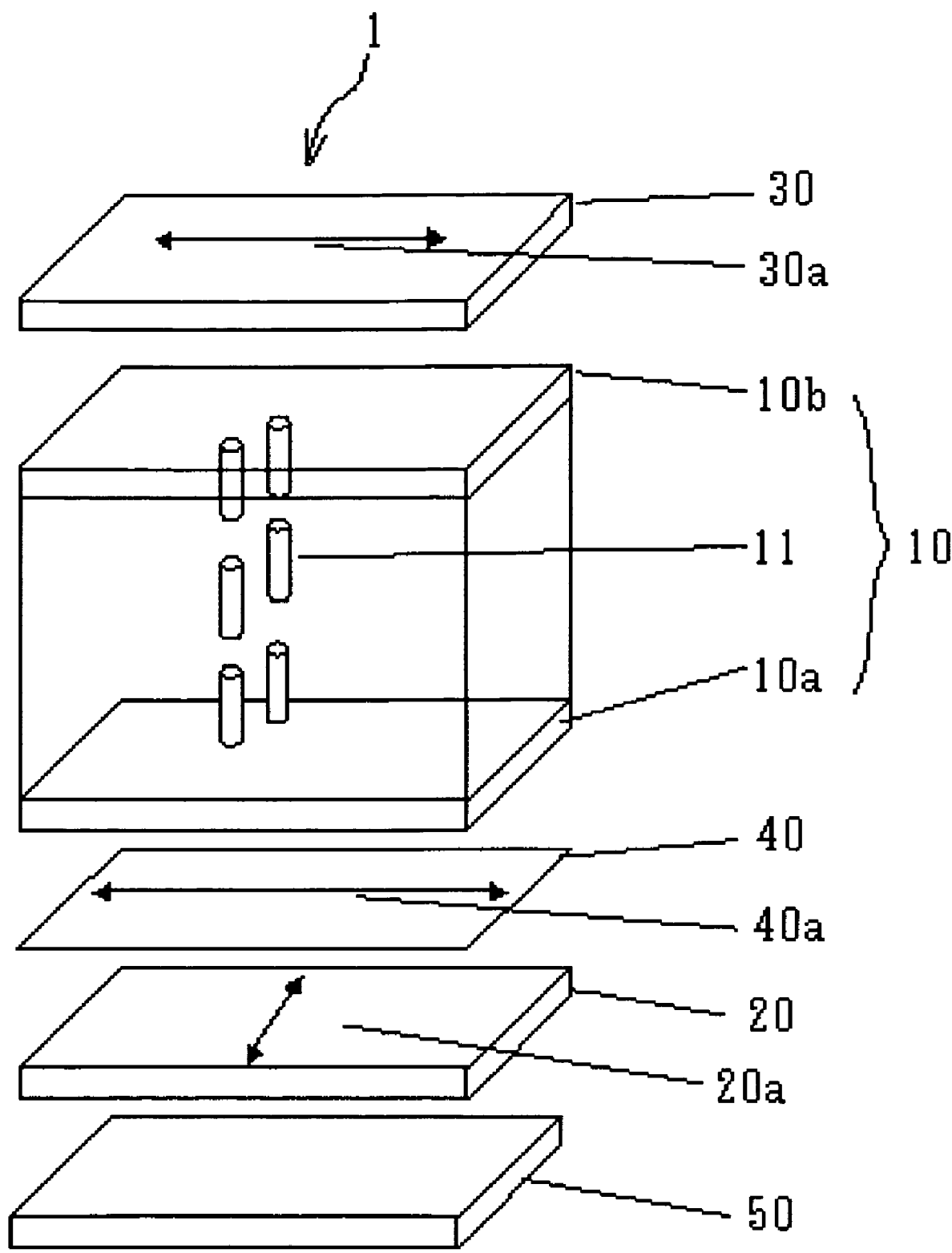
FIG. 1 is a cross-sectional view illustrating the configuration of a liquid crystal display device of an embodiment of the present invention.

FIG. 1 is a perspective view illustrating the configuration of one embodiment of a liquid crystal display device in accordance with the present invention.

As shown in FIG. 1, a liquid crystal display device 1 in accordance with the present invention has a liquid crystal cell 10, a first polarizing plate 20 and a second polarizing plate 30 which are disposed so as sandwich the liquid crystal cell 10, and a backlight 50 which is disposed so as to sandwich the first polarizing plate 20 together with the liquid crystal cell 10.

<Liquid Crystal Cell>

As shown in FIG. 1, the liquid crystal cell 10 has a first substrate 10a, a second substrate 10b, and a liquid crystal layer 11 formed from liquid crystal molecules sandwiched between the substrates.

A liquid crystal cell is classified into display modes such as TN (Twisted Nematic), IPS (In-Plane Switching), OCB (Optically Compensatory Bend), VA (Vertically Aligned), and ECB (Electrically Controlled Birefringence) depending upon a difference of the alignment state of a liquid crystal molecule which undergoes an ON/OFF display. However, these polarizing plates used in the liquid crystal display device of the invention can be used in any of the display modes regardless of a transmission type or a reflection type.

An alignment film (not shown) is formed on each of the surfaces of the first substrate 10a and second substrate 10b which bring into contact with the liquid crystal molecule 11a (the surface will be hereinbelow sometimes referred to as "internal surface"), and the alignment of the liquid crystal molecule 11a in the non-applied state or low applied state of an electric field is controlled.

In FIG. 1, the liquid crystal cell 10 shows a liquid crystal cell of VA mode, which is not controlled by rubbing treatment. However, in other modes, alignment treatment such as the rubbing treatment is applied to control an alignment direction of azimuth direction.

A transparent electrode (not shown) capable of applying an electric filed to the liquid crystal layer 11 is formed on each of the internal surfaces of the first substrate 10a and second substrate 10b.

Here, the size of $\Delta nd$ which is the product of a thickness d of the liquid crystal layer 11 and a refractive index anisotropy $\Delta n$ changes the brightness at the time of white display. For that reason, in order to obtain the maximum brightness, its range is set up for every display mode.

Generally, by disposing an intersecting angle between an absorption axis 30a of the second polarizing plate 30 and an absorption axis 20a of the first polarizing plate 20 so as to be approximately at right angles to each other, a high contrast is obtained.

The liquid crystal display device in which the polarizing plate of the invention is used is not limited to the configuration of FIG. 1 but may contain other members. For example, a color filter may be disposed between the liquid crystal cell and the polarizer.

Further, in FIG. 1, a configuration is shown in which an optical compensation film 40 is disposed between the liquid crystal cell 10 and the first polarizing plate 20, but an optical compensation film may be also disposed between the liquid crystal cell 10 and the second polarizing plate 30, similarly to the first polarizing plate 20.

The optical compensation film 40 may be disposed in a stacked configuration joined with an adhesive, or may be disposed as the so-called integral elliptic polarizing plate in which protective films (described hereinbelow) disposed at the side of the liquid crystal cell 10 in the first polarizing plate and second polarizing plate are used to enlarge a viewing angle.

When the liquid crystal display device of the present invention is used as a transmission type, a backlight 50 as a light source such as a cold cathode or hot cathode fluorescent tube or a light-emitting diode, a field emission element, or an electroluminescent element can be disposed on the back surface.

Also, the liquid crystal display device of the present invention may be a reflection type. In such case, one sheet of the polarizing plate may be disposed in the observation side (on the side of the second polarizing plate 30 disposed in the liquid crystal cell 10), and a reflection film is disposed either on the back surface of the liquid crystal cell 10 or on the internal surface of the first substrate of the liquid crystal cell 10. As a matter of course, a front light, which is a lighting for illuminating a display, using the aforementioned light source may be provided in the observation side of the liquid crystal cell 10.

<Polarizing Plate>

The polarizing plate has a polarizer and at least two protective films disposed so as to sandwich the polarizer. If necessary, the polarizing plate is provided with a film that increases brightness.

Figure 2A:
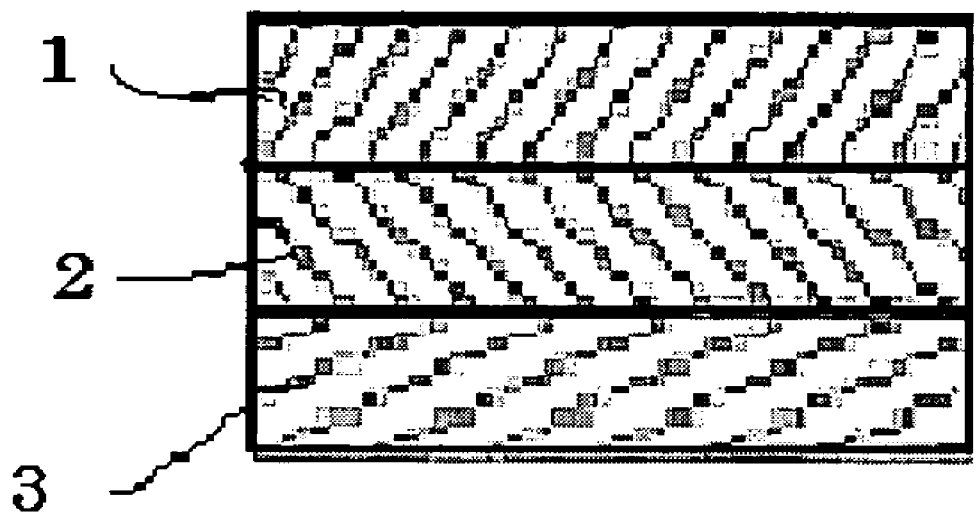
FIG. 2A is a cross-sectional view illustrating the configuration of a polarizing plate in an embodiment of the present invention.

FIG. 2A is a cross-sectional view illustrating the configuration of the polarizing plate. As shown in FIG. 2A, in the polarizing plate, respective protective films 1, 3 are disposed on both side surfaces of the polarizer 2. Of the two protective films 1, 3, one protective film may be bonded as a functional optical film 3 to the polarizer 2 via an adhesive (not shown in the figure).

It is also preferred to control the peel strength between the respective layers such as the functional optical film and the protective film at 4.0 N/25 mm or more as described in JP-A No. 2002-311238. The functional optical film is preferably disposed in the liquid crystal cell side or the side opposite to the liquid crystal cell, namely in the display side or the backlight side depending upon the desired function.

<<Polarizer>>

The material of the polarizer preferably consists of polyvinyl alcohol (PVA) and a dichroic molecule. As disclosed in JP-A No. 11-248937, a polyvinylene polarizer obtained by aligning a polyene structure produced by dehydrating and dechlorinating PVA or polyvinyl chloride may be used.

PVA is a polymer material obtained by saponifying a polyvinyl acetate. PVA may contain a component copolymerizable with vinyl acetates such as an unsaturated carboxylic acid, unsaturated sulfonic acid, olefin and vinylether. Further, a modified PVA containing an acetoacetyl group, sulfonic acid group, carboxyl group, oxyalkylene group or the like may be used.

The saponification degree of PVA is not particularly limited and may be appropriately selected depending on the purpose. It is preferably 80 mol % to 100 mol %, more preferably 90 mol % to 100 mol % in terms of solubility.

The polymerization degree of PVA is not particularly limited and may be appropriately selected depending on the purpose. It is preferably 1,000 to 10,000 and more preferably 1,500 to 5,000.

The syndiotacticity of PVA is not particularly limited and may be appropriately selected depending on the purpose. It is preferably 55% or more to improve durability as disclosed in Japanese Patent (JP-B) No. 2978219, and may be also preferably 45% to 52.5% as disclosed in JP-B No. 3317494. PVA which has been filmed preferably has a dichroic molecule incorporated therein to form a polarizer.

As the method of producing a PVA film there is preferably employed a method which comprises casting a raw material solution having a PVA resin dissolved in water or an organic solvent to form a film. The concentration of the polyvinyl alcohol resin in the raw material solution is normally 5% by mass to 20% by mass. By subjecting the raw material solution to film formation by the casting method, PVA film having a thickness of 10 μm to 200 μm can be produced.

For the method of producing the PVA film, reference can be made to JP-B No. 3342516, JP-A Nos. 9-328593, 2001-302817 and 2002-144401.

The crystallization degree of the PVA film is not particularly limited and may be appropriately selected depending on the purpose. A PVA film having an average crystallization degree (Xc) of 50% by mass to 75% by mass as disclosed in JP-B No. 3251073 or a PVA film having a crystallization degree of 38% or less as disclosed in JP-A No. 2002-236214 may be used to eliminate the in-plane dispersion of hue.

The birefringence (Δn) of a PVA film is preferably small. A PVA film having a birefringence of $1.0 \times 10^{-3}$ or less as disclosed in JP-B No. 3342516 is preferably used. However, as disclosed in JP-A No. 2002-228835, the birefringence of the PVA may be 0.02 to 0.01 in order to obtain a high polarization degree while avoiding the break during the stretching of the PVA film. As disclosed in JP-A No. 2002-060505, the value of $(n_x+n_y)/2-n_z$ may be 0.0003 to 0.01.

The in-plane retardation (Re) of PVA film is preferably 0 nm to 100 nm and more preferably 0 nm to 50 nm.

The (film) thickness-direction retardation Rth of the PVA film is preferably 0 nm to 500 nm, more preferably 0 nm to 300 nm.

In addition, the polarizing plate used in the liquid crystal display device of the invention may be a PVA film having a 1,2-glycol bond of 1.5 mol % or less disclosed in Japanese Patent No. 3021494, a PVA film having optical foreign matters having a size of 5 μm or more in an amount of 500 or less per 100 cm² disclosed in JP-A No. 2001-316492, a PVA film having a hot water cutting temperature of 1.5° C. or less in TD direction of film disclosed in JP-A No. 2002-030163 or a PVA film formed of a solution having 15% by mass or more of a plasticizer disclosed in JP-A No. 06-289225 incorporated therein based on 1 part by mass to 100 parts by mass of a polyvalent alcohol having a valency of 3 to 6 such as glycerin incorporated therein.

The film thickness of the unstretched PVA film is not particularly limited and may be appropriately selected depending on the purpose. It is preferably 1 μm to 1 mm and more preferably 20 μm to 200 μm in terms of film storage stability and uniformity in stretching. As disclosed in JP-A No. 2002-236212, a thin PVA film arranged such that the stress developed when stretched in water by a factor of from 4 to 6 is 10 N or less may be used.

As the dichroic molecule there is preferably used a high order iodine ion such as $I_3^-$ and $I_5^-$ or a dichroic dye. Of these, a high order iodine ion is preferably used in the invention. The high order iodine ion can be produced by dipping a PVA film in a solution obtained by dissolving iodine in an aqueous solution of potassium iodide and/or aqueous solution of boric acid so that it is adsorbed to and aligned in the PVA film as described in "Application of Polarizing Plates", Ryo Nagata ed., CMC Publishing Co., Ltd., and "Industrial Material", Vol. 28, 7th edition, pp. 39 to 45.

The dichroic dye used as a dichroic molecule is preferably an azo dye. Of theses, more preferred are a bisazo and trisazo dye. The dichroic dye is preferably water-soluble. Therefore, a hydropbilic substituent such as a sulfonic acid group, amino group and hydroxyl group is preferably incorporated in the dichroic molecule to form a free acid or an alkaline metal salt, ammonium salt or amine salt.

Examples of the dichromatic dyes include benzidine dyes such as C.I. Direct Red 37, Congo Red (C.I. Direct Red 28), C.I. Direct Violet 12, C.I. Direct Blue 90, C.I. Direct Blue 22, C.I. Direct Blue 1, C.I. Direct Blue 151, C.I. Direct Green 1; diphenyl urea dyes such as C.I. Direct Yellow 44, C.I. Direct Red 23, C.I. Direct Red 79; stilbene dyes such as C.I. Direct Yellow 12; dinaphthylamine dyes such as C.I. Direct Red 31; J acid dyes such as C.I. Direct Red 81, C.I. Direct Violet 9, C.I. Direct Blue 78, and further include C.I. Direct Yellow 8, C.I. Direct Yellow 28, C.I. Direct Yellow 86, C.I. Direct Yellow 87, C.I. Direct Yellow 142, C.I. Direct Orange 26, C.I. Direct Orange 39, C.I. Direct Orange 72, C.I. Direct Orange 106, C.I. Direct Orange 107, C.I. Direct Red 2, C.I. Direct Red 39, C.I. Direct Red 83, C.I. Direct Red 89, C.I. Direct Red 240, C.I. Direct Red 242, C.I. Direct Red 247, C.I. Direct Violet 48, C.I. Direct Violet 51, C.I. Direct Violet 98, C.I. Direct Blue 15, C.I. Direct Blue 67, C.I. Direct Blue 71, C.I. Direct Blue 98, C.I. Direct Blue 168, C.I. Direct Blue 202, C.I. Direct Blue 236, C.I. Direct Blue 249, C.I. Direct Blue 270, C.I. Direct Green 59, C.I. Direct Green 85, C.I. Direct Brown 44, C.I. Direct Brown 106, C.I. Direct Brown 195, C.I. Direct Brown 210, C.I. Direct Brown 223, C.I. Direct Brown 224, C.I. Direct Black 1, C.I. Direct Black 17, C.I. Direct Black 19, C.I. Direct Black 54.

Moreover, dichromatic dyes disclosed in Japanese Patent Application Laid-Open (JP-A) Nos. 62-70802, 1-161202, 1-172906, 1-172907, 1-183602, 1-248105, 1-265205 and 7-261024 are preferably used.

Two or more of thsese dichromatic dyes can be mixed to produce dichromatic molecules having various hues. When the dichromatic dye is used, adsorption thickness may be 4 μm or more as disclosed in JP-A No. 2002-082222.

When the content of the dichroic molecules in the PVA film is too small, the polarization degree is low. Further, when the content of the dichroic molecules in the PVA film is too large, the single plate transmission is lowered. Therefore, the content of the dichroic molecules in the film is normally adjusted to a range of 0.01% by mass to 5% by mass based on the mass of the polyvinyl alcohol resin constituting the matrix of the film.

The thickness of the polarizer is preferably from 5 μm to 40 μm, more preferably from 10 μm to 30 μm.

It is also preferred that the ratio, A/B, of the thickness of the polarizer (A) to the thickness of the protective film (B) be $0.01 \leq A/B \leq 0.8$ as disclosed in JP-A No. 2002-174727.

<<Protective Film Demonstrating Low Moisture Permeability>>

Of the first polarizing plate and second polarizing plate disposed on both sides of the liquid crystal cell in the liquid crystal display device in accordance with the present invention, because at least one protective film of the polarizing plate on the viewing side, that is, the second polarizing plate, is in contact with the air, it is easily affected by the temperature and moisture environment. Therefore, from the standpoint of endurance, a protective film with a low moisture permeability is preferred (sometimes referred to hereinbelow as "film with a low moisture permeability"). More specifically, the moisture permeability at a temperature of 60° C. and a relative humidity of 95% of at least one protective film of the second polarizing plate is preferably equal to or less than 300 g/m²·day, more preferably equal to or less than 200 g/m²·day and still more preferably equal to or less than 100 g/m²·day.

<<Measurement of Moisture Permeability>>

A method described in "Physical Properties of Polymer II" (Polymer Experimental Course No. 4, Kyoritsu Shuppan Co., Ltd.), pp. 285 to 294: Measurement of Vapor Penetration Amount (mass method, temperature measurement method, vapor pressure method, adsorption measurement method) can be applied as a method for measuring moisture permeability in the present invention. A film sample with a diameter of 70 mm in accordance with the present invention was humidity conditioned for 24 h at 60° C. and 95% RH and the amount of moisture per unit surface area was calculated ($g/m^2$) according to JIS Z-0208 by the difference in mass before and after the humidity conditioning.

As for the value of moisture permeability used in accordance with the present invention, when the protective film that is the measurement object has a base material layer and a coat layer provided on the base material layer to control the moisture permeability of the protective film, the value of moisture permeability from the side of the base material layer is used.

In accordance with the present invention, at least one protective film of the second polarizing plate is not particularly limited and the protective film may be appropriately selected depending on the purpose, provided that it satisfies the above-described condition relating to moisture permeability as a protective film with moisture permeability and has a transmissivity of 80% or more. For example it is preferred that a transparent film be used that is provided with a coat layer having low moisture permeability on at least one surface of a base material layer (transparent base material film) composed of any resin from among norbornene resins, polyester resins, polycarbonate resins, and cellulose acylate resins.

The coat layer in the case where a cellulose acylate resin is used as the transparent base material film is not particularly limited and the coat layer may be appropriately selected depending on the purpose, provided that the coat layer satisfies the above-described condition relating to moisture permeability. Examples of suitable coat layers include a coat layer containing a resin containing repeating units derived from a chlorine-containing vinyl monomer (sometimes referred to hereinbelow as "chlorine-containing resin"), a coat layer containing a compound composed of an alkoxysilane, a compound having a functional group that reacts with a hydroxyl group or an alkoxyl group, and a silane coupling agent, a coat layer containing as the main component silica formed from a coating composition containing a polysilazane, a coat layer containing a hydrophilic compound, a coat layer obtained by laminating a resin composed of a sugar and a compound containing a formyl group, a coat layer obtained by laminating a resin composition composed of a polymer compound containing an amino group and an organosilane compound containing a functional group reactable with an amino group and also containing a silanol group, and a coat layer containing a layered inorganic compound with a particle radius of 0.1 µm to 10 µm. Among them at least one of a coat layer containing a resin containing repeating units derived from a chlorine-containing vinyl monomer and a coat layer containing a vinyl alcohol resin are preferred.

[Coat Layer Containing a Chlorine-Containing Resin]

Typical examples of the chlorine-containing vinyl monomer include vinyl chloride and vinylidene chloride. A chlorine-containing resin can be obtained by copolymerizing the vinyl chloride or vinylidene chloride monomer with a monomer copolymerizable therewith.

[Monomers Copolymerizable with Chlorine-Containing Vinyl Monomers]

Examples of copolymerizable monomers include monomers selected from olefins, styrene, acrylic acid esters, methacrylic acid esters, acrylamides, methacrylamides, itaconic acid diesters, maleic acid esters, fumaric acid diesters, N-alkylmaleimides, maleic anhydride, acrylonitrile, vinyl ethers, vinyl esters, vinyl ketones, vinyl heterocyclic compounds, glycidyl esters, unsaturated nitriles, and unsaturated carboxylic acids.

Examples of olefins include dicyclopentadiene, ethylene, propylene, 1-butene, 1-pentene, isoprene, chloroprene, butadiene, 2,3-dimethylbutadiene.

Examples of styrenes incude styrene, methyl styrene, dimethyl styrene, trimethyl styrene, ethyl styrene, isopropyl styrene, chloromethyl styrene, methoxy styrene, acetoxy styrene, chlorostyrene, dichlorostyrene, bromostyrene, trifluoromethyl styrene and vinylbenzoic acid methyl ester.

Examples of acrylic esters and methacrylic acid esters include methylacrylate, ethylacrylate, propylacrylate, butylacrylate, amylacrylate, 2-ethylhexylacrylate, octylacrylate, t-octylacrylate, 2-methoxyethylacrylate 2-butoxyethylacrylate, 2-phenoxyethylacrylate, chloroethylacrylate, cyanoethylacrylate, dimethylaminoethylacrylate, benzylacrylate, methoxybenzylacrylate, furfurylacrylate, phenylacrylate, methylmethacrylate, ethylmethacrylate, propylmethacrylate, isopropylmethacrylate, butylmethacrylate, amylmethacrylate, hexylmethacrylate, 2-ethylhexylmethacrylate, octylmethacrylate, benzylmethacrylate, cyanoacetoxyethyl methacrylate, chlorobenzyl methacrylate, sulfopropyl methacrylate, N-ethyl-N-phenylaminoethyl methacrylate, 2-methoxyethylmethacrylate, 2-(3-phenylpropyloxy)ethylmethacrylate, dimethylamino phenoxyethyl methacrylate, furfuryl methacrylate, tetrahydrofurfuryl methacrylate, phenylmethacrylate, cresyl methacrylate, naphthyl methacrylate, hydroxyethyl acrylate, hydroxyethyl methacrylate, hydroxypropyl acrylate, hydroxypropylmethacrylate, 3-chloro-2-hydroxypropyl methacrylate, 3-chloro-2-hydroxypropyl methacrylate, 2,2-dimethylhydroxypropylacrylate, 5-hydroxypentyl acrylate, diethylene glycol monoacrylate, trimethylolpropane monoacrylate, pentaerythritol monoacrylate, 2,2-dimethyl-3-hydroxypropyl methacrylate, 5-hydroxypropylmethacrylate, diethylene glycol monomethacrylate, trimethylolpropane monomethacrylate, pentaerythritol monomethacrylate.

Examples of vinyl ethers include methyl vinyl ether, butyl vinyl ether, hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, dimethylaminoethyl vinyl ether, diethylaminoethyl vinyl ether, butylaminoethyl vinyl ether, benzyl vinyl ether, tetrahydrofurfuryl vinyl ether, vinyl phenyl ether, vinyl tolyl ether, vinyl chlorophenyl ether, vinyl 2,4-dichlorophenyl ether, vinyl naphthyl ether and vinyl anthranyl ether.

Examples of vinyl esters include vinyl acetate, vinyl propionate, vinyl butyrate, vinyl isobutyrate, vinyl dimethyl propionate, vinyl ethyl butyrate, vinyl valerate, vinyl caproate, vinyl chloroacetate, vinyl dichloroacetate, vinyl methoxy acetate, vinyl butoxyacetoacetate, vinyl phenyl acetate, vinyl acetoacetate, vinyl lactate, vinyl-β-phenyl butyrate, vinyl cyclohexyl carboxylate, vinyl benzoate, vinyl salicylate, vinyl chlorobenzoate, vinyl tetrachlorobenzoate and vinyl naphthoate.

Examples of acrylamides include acrylamide, methyl acrylamide, ethyl acrylamide, propyl acrylamide, butyl acrylamide, t-butyl acrylamide, cyclohexyl acrylamide, benzyl acrylamide, hydroxymethyl acrylamide, methoxyethyl acrylamide, dimethylaminoethyl acrylamide, phenyl acrylamide, dimethyl acrylamide, diethyl acrylamide, β-cyanoethyl acrylamide, N-(2-acetoacetoxyethyl)acrylamide.

Examples of methacrylamides include methacrylamide, methyl methacrylamide, ethyl methacrylamide, propyl methacrylamide, butyl methacrylamide, t-butyl methacrylamide, cyclohexyl methacrylamide, benzyl methacrylamide, hydroxy methyl methacrylamide, methoxyethyl methacrylamide, dimethyl aminoethyl methacrylamide, phenyl methacrylamide, dimethyl methacrylamide, diethyl methacrylamide, β-cyanoethyl methacrylamide, N-(2-acetoacetoxyethyl)acrylamide.

As the copolymerizable monomer, a hydroxyl group-containing acrylamides may be used. Examples thereof include N-hydroxymethyl-N-(1,1-dimethyl-3-oxo-butyl)acrylamide, N-methylolacrylamide, N-methylolmethacrylamide, N-ethyl-N-methylolacrylamide, N,N-imethylolacrylamide, N-ethanolacrylamide, N-propanolacrylamide and N-methylolacrylamide.

Examples of itaconic acid diesters include dimethyl itaconate, diethyl itaconate and dibuthyl itaconate. Examples of maleic acid diesters include diethyl maleate, dimethyl maleate and dibutyl maleate. Examples of fumaric acid diesters include diethyl fumarate, dimethyl fumarate and dibutyl fumarate.

Examples of vinyl ketones include methyl vinyl ketone, phenyl vinyl ketone and methoxyethyl vinyl ketone. Examples of vinyl heterocyclic compounds include vinylpyridine, N-vinylimidazole, N-vinyloxazolidone, N-vinyltriazole, N-vinylpyrrolidone. Examples of glycidyl esters include glycidyl acrylate and glycidyl methacrylate. Examples of unsaturated nitriles include acrylonitrile and methacrylonitrile. Examples of N-alkylmaleimides include N-ethylmaleimide and N-butylmaleimide.

Examples of unsaturated carboxylic acids include acrylic acid, metharylic acid, itaconic acid, maleic acid, fumaric acid and crotonic acid, and further include anhydrides of fumaric acid, itaconic acid and maleic acid.

These copolymerizable monomers may be used in combination.

Examples of the chlorine-containing resins include those disclosed in Japanese Patent Application Laid-Open (JP-A) Nos. 53-58553, 55-43185, 57-139109, 57-139136, 60-235818, 61-108650, 62-256871, 62-280207 and 63-256665.

The content ratio of the chlorine-containing vinyl monomer in the chlorine-containing resins is preferably 50% by mass to 99% by mass, more preferably 60% by mass to 98% by mass and still more preferably 70% by mass to 97% by mass. Where the content ratio of the chlorine-containing vinyl monomer is 50% by mass or more, no adverse effects such as degraded moisture permeability occur, and where the content ratio is 99% by mass or less, the desirable solubility in a variety of solvents can be obtained.

The chlorine-containing resins are available from Asahi Kasei Chemicals and KUREHA CORPORATION. Examples of those available from Asahi Kasei Chemicals include "Saran resin R241C", "Saran resin F216", "Saran resin R204", "Saran latex L502", "Saran latex L529B", "Saran latex L536B", "Saran latex L544D", "Saran latex L549B", "Saran latex L551B", "Saran latex L557", "Saran latex L561A", "Saran latex L116A", "Saran latex L411A", "Saran latex L120", "Saran latex L123D", "Saran latex L106C", "Saran latex L131A", "Saran latex L111", "Saran latex L232A" and "Saran latex L321B".

Of these, "Saran resin F216" is preferably used because it is soluble in ketone solvents such as methyl ethyl ketone and cyclohexanone.

"Saran resin R204" is more preferably used, because of its high crystallinity. It can decrease the moisture permeability of the coat layer, does not easily dissolve in a solvent used for forming a hard coat layer, and not easily form a mixing area with the hard coat layer.

Because the coat layer is most often coated by a wet process, a solvent used in the coating composition for the coat layer becomes an especially important factor. Examples of requirements placed on the solvent include the capability to dissolve completely the above-described solutes and prevent the occurrence of uneven coating and uneven drying in the coating-drying process.

Further, it is still more preferred that the following features (properties) be provided. Thus, in order to prevent the deterioration of surface flatness and the occurrence of defects such as whitening or the like, the solubility of the transparent base material film should not be too high, and in order to maintain adhesivity, the dissolution and swelling of the support body should be minimized.

One solvent, or two or more solvents may be used, and it is particularly preferred that solubility and swelling ability of the transparent support body (transparent base material film), solubility and drying properties of the material, and cohesivity of particles be adjusted.

Adhesivity to the transparent support body can be increased without degrading other properties and surface state by adding a small amount of a solvent with a high swelling ability to a main solvent with low ability to cause the swelling of the transparent support body.

The coating liquid may contain an organic solvent such as a ketone, an alcohol, an ester, and an ether.

Examples of preferred organic solvents include tetrahydrofuran, ketones (methyl ethyl ketone, acetone, methyl isobutyl ketone, cyclohexanone, and the like), ethyl acetate, and butyl acetate, and it is still more preferred that BTX such as toluene be used.

In accordance with the present invention, when the chlorine-containing resin is vinylidene chloride, it is preferred that tetrahydrofuran be used as the main solvent.

Further, it is more preferred that solubility in toluene and ketone solvents be ensured by selecting a copolymer of vinylidene chloride and that toluene and ketone solvents be used without using tetrahydrofuran.

It is also preferred that a method be used by which the above-described solvents are added within a range in which the solute is dissolved in tetrahydrofuran. When the chlorine-containing resin is supplied as a latex dispersion, water is preferably used as the main solvent. In the case of latex dispersions, it is preferred that a surfactant or a thickening agent be also used.

When a coat layer containing a chlorine-containing resin is coated on a transparent base material film, it is preferred that a silica powder such as Silysia (manufactured by Fuji Sylysia Co., Ltd.), Mizukasil (manufactured by Mizusawa Industrial Chemicals, Ltd.), and Nipposil (manufactured by Nippon Silica Kogyo KK) be added in an amount of 0.2 parts by weight to 1.0 part by mass with respect to 100 parts by mass of the chlorine-containing resin, or a wax emulsion such as Paraffin Wax (manufactured by Nippon Seiro Co., Ltd.), behenic acid (manufactured by Nippon Oils and Fats Co., Ltd.), and stearic acid (manufactured by Nippon Oils and Fats Co., Ltd.) be added in an amount of 0.2 parts by mass to 5.0 parts by mass with respect to 100 parts by mass of the chlorine-containing resin in order to improve blocking resistance. It is also preferred that a modified wax such as described in paragraphs [0012] to [0016] of Japanese Patent Application Laid-Open (JP-A) No. 09-143419 be used.

Because the chlorine-containing resin is decomposed and colored under heat, light, and UV irradiation, it is preferred that a stearate of lead, zinc, barium, or the like, a silver salt, magnesium oxide, or the like be also used as a stabilizer.

Antioxidants described in paragraphs [0013] to [0020] of Japanese Patent Application Laid-Open (JP-A) No. 2004-359819 may be also used.

In order to improve adhesion of the coat layer containing the chlorine-containing resin to the transparent base material film or other layers, it is preferred that an isocyanate adhesive such as Coronate L (manufactured by Nippon Polyurethane Industry Co., Ltd.) and Takenate A-3 (manufactured by Takeda Chemical Industries Co., Ltd.) be added in an amount of 0.1 parts by mass to 1.0 part by mass with respect to 100 parts by mass of the chlorine-containing resin.

A method for applying a coating liquid in the invention is not particularly limited and may be appropriately selected depending on the purpose and examples thereof include known methods such as dip coating, air knife coating, curtain coating, roller coating, wire bar coating, gravure coating, extrusion coating (die coating) (U.S. Pat. No. 2,681,294) and microgravure coating. Of these, microgravure coating and extrusion coating are preferably used in terms of high productivity and uniformity of a coated film.

The conditions of drying in the present invention are preferably such that the concentration of the organic solvent in the coated liquid film is 5% by mass or less, more preferably 2% by mass or less and still more preferably 1% by mass or less after drying. The drying conditions are affected by the thermal strength and conveying speed of the transparent base material film and the duration of the drying process, but from the standpoint of film hardness and prevention of bonding, it is preferred that the content ratio of the organic solvent be as low as possible. When no organic solvent is contained, it is possible to omit the drying step and perform UV irradiation immediately after coating.

[Thickness of Coat Layer]

The thickness of the coat layer is preferably 1 μm to 10 μm, more preferably 2 μm to 9 μm and still more preferably 3 μm to 8 μm. Where the thickness of the coat layer is less than 1 μm, moisture prevention ability is degraded, and where the thickness of the coat layer is above 10 μm, the film obtained is not suitable as a protective film for a polarizing plate because the film is brittle or can be easily colored.

[Haze of Coat Layer]

The haze of the coat layer is preferably 5% or less, more preferably 3% or less and still more preferably 1% or less. The coat layer may have any ratio of the surface haze to the inner haze, but it is more preferred that the surface haze be 1% or less.

[Coat Layer Containing Vinyl Alcohol Resin]

Examples of vinyl alcohol resins for constituting the coat layer include homopolymers such as poly(vinyl alcohol) (PVA) and ethylene-vinyl alcohol copolymer (EVOH).

Part of such vinyl alcohol resins may be subjected to carbonyl modification, silanol modification, epoxy modification, acetoacetyl modification, amino modification, or ammonium modification. Copolymers containing a diacetone acrylamide unit in part thereof may be also used.

Further, vinyl alcohol resins of various kinds may be used alone or in combinations of two or more thereof.

The saponification degree of the vinyl alcohol resin is preferably 80 mol % or more, more preferably 96 mol % or more and still more preferably 99 mol % or more.

The polymerization degree of the vinyl alcohol resin is preferably 200 to 5,000, more preferably 400 to 5,000 and still more preferably approximately 500 to 3,000 in terms of permeability and coating property.

It is further preferred that a layered inorganic compound be contained in the coat layer in order to decrease further the moisture permeability of the coat layer containing the vinyl alcohol resins.

The layered inorganic compound is an inorganic compound that has a structure consisting of stacked unit crystal layers and demonstrates the ability to swell or cleave due to coordination or absorption of a solvent between the layers.

Examples of such layered inorganic compounds include swellable hydrated silicates, for example, smectite-group clay minerals (montmorillonite, saponite, hectorite, and the like), vermiculite-group clay minerals, kaolinite-group clay minerals, and phyllosilicates (mica and the like).

Synthetic layered inorganic compounds can be also advantageously used. Examples of synthetic layered inorganic compounds include synthetic smectites (hectorite, saponite, stevensite, and the like) and synthetic mica. Among them, smectite, montmorillonite, and mica are preferred, montmorillonite and mica are more preferred, and mica is still more preferred.

From the standpoint of reducing moisture permeability and inhibiting coloration, it is especially preferred that synthetic mica be used. These layered inorganic compounds may be also subjected to organic conversion treatment.

From the standpoint of ensuring both the gas barrier ability and the adhesivity between the base material and the gas barrier layer, it is preferred that the swellable layered inorganic compound be subjected to pulverization.

The pulverized swellable layered inorganic compound usually has a plate-like or flat shape. The planar shape thereof is not particularly limited and the compound may have an undefined shape.

The mean particle size (mean particle size of planar shape) of the pulverized swellable layered inorganic compound is preferably 0.1 μm to 10 μm, more preferably 0.5 μm to 8 μm and still more preferably 0.8 μm to 6 μm. Where the mean particle size of the swellable layered inorganic compound is less than 0.1 μm, the moisture permeability reduction effect is insufficient, and the mean particle size of the swellable layered inorganic compound of more than 10 μm is undesirable because the haze value increases and surface roughness also increases.

The concentration of the layered inorganic compound is preferably 3% by mass to 60% by mass, more preferably 3% by mass to 50% by mass and still more preferably 3% by mass to 40% by mass. Where the concentration of the layered inorganic compound is less than 3% by mass the moisture permeability reduction effect is insufficient, and the concentration of the layered inorganic compound of more than 60% by mass is undesirable because the haze value increases and brittleness is degraded.

In accordance with the present invention, a crosslinking agent for a vinyl alcohol resin can be added as a resin component to the vinyl alcohol resin and layered inorganic compound. Such addition can increase water resistance of the adhesive layer.

The crosslinking agent that can be used for this purpose is not particularly limited and any well-known crosslinking agent can be advantageously used.

Examples of crosslinking agents include phenolic resins, melamine resins, urea resins, polyamide polyurea, dimethylolurea, dimethylmelamine, polyepoxy compounds, dialdehyde compounds, polyisocyanate resins, aziridine compounds, polyamidoamine epichlorohydrin compounds, activated vinyl compounds, dicarbonate compounds, hydrazine group-containing compounds (polycarboxylic acid polyhydrazide compounds), colloidal silica, zirconium salts, polyvalent metal salts, boric acid, phosphoric acid, polyacrylic acid, dicarboxylic acids, adipic anhydride, succinic anhydride, and titanium compounds such as tetraisopropyl titanate and diisopropoxybis(acetylacetone) titanate. In addition, coupling agents such as 3-glycidoxypropylmethoxysilane and radical generating agents such as peroxides can be also used. A catalyst for enhancing the crosslinking reaction and other additives can be also added.

The amount of crosslinking agent that is added ((crosslinking agent)/(vinyl alcohol resin+crosslinking agent)) is preferably 0.5% by mass or more, more preferably 1% by mass or more and still more preferably 2% by mass or more. When the mass ratio of the crosslinking agent to the sum of the PVA polymer and crosslinking agent is less than 0.5% by mass, no effect is demonstrated by the addition of the crosslinking agent. The mass ratio of the crosslinking agent to the vinyl alcohol resins and crosslinking agent is preferably 50% by mass or less, more preferably 40% by mass or less and still more preferably 30% by mass or less. Some crosslinking agents such as aldehyde compounds are discolored and yellowed under heating. Therefore, the amount of such crosslinking agents has to be decreased to control the discoloration within the allowed range.

Examples of the methods for forming the coat layer consisting of the vinyl alcohol resin or the vinyl alcohol resin and layered inorganic compound include known methods such as dip coating, air knife coating, curtain coating, roller coating, wire bar coating, gravure coating, extrusion coating (die coating) (U.S. Pat. No. 2,681,294) and microgravure coating. Of these, microgravure coating and extrusion coating are preferably used in terms of high productivity and uniformity of a coated film. In order to optimize the viscosity characteristic of the liquid with respect to the coating apparatus during film formation, a viscosity control agent such as a thickener can be added to the coating liquid in order to adjust the viscosity of the coating liquid. Further, in order to improve further the moisture proofing ability and water resistance of the coat layer, it is preferred that the coat layer be heat treated for several minutes at a temperature within a range of 90° C. or more to 150° C. or less after the coat layer has been coated on a cellulose acylate substrate. It is still more preferred that heating be conducted at a temperature within a range of 130° C. or more to 150° C. or less. From the standpoint of productivity and water resistance, it is preferred that the heat treatment time be 1 min or more to 20 min or less, more preferably 5 min or more to 15 min or less. From the standpoint of adhesion of the resin layer to the cellulose acylate substrate, it is preferred that the cellulose acylate be saponified in advance.

[Polyester Resin]

No particular structural limitation is placed on the polyester resin. Specific examples of suitable polyester resins include polyethylene terephthalate, polyethylene naphthalate, polybutylene terephthalate, and polybutylene naphthalate. Among them, from the standpoint of cost and mechanical strength, it is especially preferred that polyethylene terephthalate be used. The especially desirable among the polyester resins, are the resins obtained by polycondensation of aromatic dicarboxylic acids and aliphatic glycols.

In addition to terephthalic acid, examples of suitable aromatic dicarboxylic acids include isophthalic acid and 2,6-naphthalenedicarboxylic acid. Lower alkyl esters (derivatives that can form esters, such as anhydrides and lower alkyl esters) thereof can be also used.

Examples of aliphatic glycols include ethylene glycol, propylene glycol, butane diol, neopentyl glycol, 1,4-cyclohexane dimethanol, diethylene glycol, and p-xylylene glycol.

Among them, resins containing as the main component polyethylene terephthalate obtained by a reaction of terephthalic acid and ethylene glycol are preferred.

The resin containing as the main component polyethylene terephthalate is a copolymer with a content of polyethylene terephthalate repeating units of 80 mol % or more, or in the case of a blend, a resin containing polyethylene terephthalate at 80% by mass or more.

Other components may be copolymerized and other polymers may be blended with the polyester used for the optical film in accordance with the present invention, provided that the effect of the present invention is not degraded.

In the polyester that is used in accordance with the present invention, an end hydroxyl group and/or a carboxyl group can be blocked with a monofunctional compound such as benzoic acid, benzoylbenzoic acid, benzyloxybenzoic acid, and a methoxypolyalkylene glycol. Alternatively, the polyester may be modified with a very small amount of trifunctional or tetrafunctional ester-forming compound, such as glycerin and pentaerythritol, within a range in which a substantially linear copolymer can be obtained.

A bisphenol compound and a compound having a naphthalene ring or a cyclohexane ring can be copolymerized with the polyester used in accordance with the present invention with the object of increasing the heat resistance of the film.

Further, it is preferred that glass transition temperature (Tg) of the polyester used in accordance with the present invention be 80° C. or higher, more preferably 90° C. or higher. Where the glass transition temperature is less than 80° C., the dimensional stability of the obtained film under high-temperature high-humidity conditions sometimes deteriorates. Tg is found by a peak of tan δ obtained by measuring dynamic viscoelasticity.

The polyester used in accordance with the present invention may also contain an antioxidant. An especially significant effect is produced when the polyester contains a compound having a polyoxyalkylene group. The type of the antioxidant to be contained in the polyester is not particularly limited, and antioxidants of various types can be used. Examples of suitable antioxidants include hindered phenol compounds, phosphate compounds, and thioether compounds. Among them, from the standpoint of transparency, antioxidants containing hindered phenol compounds are preferred. The content of the antioxidant is preferably 0.01% by mass to 2% by mass, more preferably 0.1% by mass to 0.5% by mass.

If necessary, the polyester film in accordance with the present invention can be also imparted with sliding ability. Means for imparting the sliding ability are not particularly limited, and generally employed are an external particle addition method by which inactive inorganic particles are added to a polyester, an internal particle precipitation method by which a catalyst that is added during polyester synthesis is caused to precipitate, and a method by which a surfactant or the like is coated on the film surface.

If necessary a UV absorbent can be also added to the polyester film in accordance with the present invention in order to prevent the polarizer and liquid crystal from deterioration.

For a UV absorber to excel in UV absorption ability and demonstrate good display performance when it is used in a liquid crystal display device, the transmittance at a wavelength of 380 nm of a polyester film containing the UV absorber is preferably 0% to 50%, more preferably 0% to 30% and still more preferably 0% to 10%. The transmittance at 600 nm is preferably 80% to 100%, more preferably 85% to 100% and still more preferably 90% to 100%.

The polyester film is preferably a polyester film manufactured by biaxial stretching. The polyester film can be obtained by the well-known conventional method and no specific limitation is placed on the method. In particular, the below-described method can be used. Here, the longitudinal direction denotes the film production direction (lengthwise direction), and the transverse direction denotes the direction perpendicular to the film production direction.

First, the polyester that is a starting material is molded into pellets, hot-blow dried or vacuum dried, then melt extruded and extruded into a sheet through a T-die, caused to adhere to a cooling drum by an electrostatic field application method or the like, and solidified by cooling to obtain a non-stretched sheet. The non-stretched sheet thus obtained is then heated within a range from the glass transition temperature (Tg) of the polyester to Tg+100° C. with a heating device such as a plurality of roll groups and/or an infrared heater and stretched longitudinally in a single-stage or multistage mode.

The polyester film stretched in the longitudinal direction that was thus obtained is transverse stretched within a temperature range of Tg to Tm (melting point) and then thermally fixed.

The thermally fixed film is usually cooled to a temperature equal to or less than Tg, the clip holding portions at both ends of the film are cut off, and the film is coiled. In this process, the film is preferably subjected to 0.1% to 10% relaxation treatment in the transverse diction and/or longitudinal direction within a temperature equal to or lower than a final thermal fixation temperature and equal to or higher than Tg. Means for cooling and relaxation treatment are not particularly limited, and the conventional well-known means can be used. From the standpoint of improving the dimensional stability of the film, it is especially preferred that these treatments be performed, while successively cooling the film in a plurality of temperature zones.

More optimum conditions of the above-described thermal fixation, cooling, and relaxation treatment differ depending on the polyester constituting the film. Therefore, physical properties of the obtained stretched film may be measured and the optimum conditions may be appropriately adjusted and determined to obtain the preferred properties.

When the film is manufactured, functional layers such as an antistatic layer, a sliding improving layer, an adhesive layer, and a barrier layer may be applied before and/or after stretching. In this case, if necessary, surface treatment of various kinds, such as a corona discharge treatment, an atmospheric pressure plasma treatment, and a reagent treatment can be performed.

The clip holding portions cut out from both ends of the film may be ground and reused as a starting material for the film of the same kind or as a starting material for a film of different kind after being subjected, if necessary, to a treatment such as granulation, depolymerization, and repolymerization.

The thickness of the polyester film in accordance with the present invention is preferably 5 μm to 200 μm, more preferably 5 μm to 100 μm and still more preferably 40 μm to 100 μm.

—Bonding to Polarizer—

If necessary, the bonding surfaces of the polyester resin and the polarizer can be subjected to a treatment that increases the adhesive force. Typical examples of such treatment include a dry treatment and an adhesion facilitating treatment. Specific examples of dry treatment include a corona treatment, a gas corona treatment, a plasma treatment, and a low-pressure UV treatment.

A process of coating the materials that facilitate adhesion is a specific example of adhesion facilitating treatment. Examples of materials that facilitate adhesion include cellulose resins, urethane resins, silane coupling agent, silicon primers, PVA, Nylon, and styrene resins. The dry treatment and the adhesion facilitating treatment can be also used together. Alternatively, the adhesive force can be also increased by performing saponification in an aqueous solution of sodium hydroxide. The saponification treatment can be also used together with the adhesion facilitating treatment.

[Polycarbonate Resin]

The polycarbonate resin used in accordance with the present invention can obviously be an aromatic polycarbonate that is a polyester of a carbonic acid and a glycol or a dihydric phenol and contains carbonic acid and 2,2'-bis(4-hydroxyphenyl)-propane (common name: bisphenol A) as structural units, but the present invention is not limited thereto, and examples of suitable polycarbonates include homo- or copolycarbonates containing at least one dihydric phenol selected from the group including 1,1-bis(4-hydroxyphenyl)-alkylcycloalkane, 1,1-bis(3-substituted-4-hydroxyphenyl)-alkylcycloalkane, 1,1-bis(3,5-substituted-4-hydroxyphenyl)-alkylcycloalkane, and 9,9-bis(4-hydroxyphenyl)-fluorenes as a monomer component, mixtures of the aforementioned dihydric phenols with polycarbonates containing bisphenol A as a monomer component, and copolycarbonates containing the above-described dihydric phenol and bisphenol A as monomer components.

Examples of 1,1-bis(4-hydroxyphenyl)-alkylcycloalkane include 1,1-bis(4-hydroxyphenyl)-3,3,5-trimethylcyclohexane, 1,1-bis(4-hydroxyphenyl)-3,3-dimethyl-5,5-dimethylcyclohexane, 1,1-bis(4-hydroxyphenyl)-3,3-dimethyl-5-methylcyclopentane.

Examples of 1,1-bis(3-substituted-4-hydroxyphenyl)-alkylcycloalkane include 1,1-bis(4-hydroxyphenyl)-alkylcycloalkane substituted with an alkyl group having carbon atoms of 1 to 12, and halogen group, specifically, for example, 1,1-bis(3-methyl-4-hydroxyphenyl)-3,3,5-trimethylcyclohexane, 1,1-bis(3-ethyl-4-hydroxyphenyl)-3,3-dimethyl-5,5-dimethylcyclohexane, 1,1-bis(3-chloro-4-hydroxyphenyl)-3,3-dimethyl-4-methylcyclohexane, 1,1-bis(3-bromo-4-hydroxyphenyl)-3,3-dimethyl-5-methylcyclopentane.

Examples of 1,1-bis(3,5-substituted-4-hydroxyphenyl)-alkylcycloalkane include 1,1-bis(4-hydroxyphenyl)-alkylcycloalkane substituted with an alkyl group having carbon atoms of 1 to 12, and halogen group, specifically for example, 1,1-bis(3-methyl-4-hydroxyphenyl)-3,3,5-trimethylcyclohexane, 1,1-bis(3,5-dichloro-4-hydroxyphenyl)-3,3-dimethyl-5-methylcyclohexane, 1,1-bis(3-ethyl-5-methyl-4-hydroxyphenyl)-3,3,5-trimethylcyclohexane, 1,1-bis(3,5-dimethyl-4-hydroxyphenyl)-3,3,5-trimethylcyclohexane, 1,1-bis(3,5-dimethyl-4-hydroxyphenyl)- 3,3-dimethyl-5-methylcyclopentane.

Examples of 9,9-bis(4-hydroxyphenyl)fluorenes include 9,9-bis(4-hydroxyphenyl)fluorene, 9,9-bis(3-methyl-4-hydroxyphenyl)fluorine and 9,9-bis(3-ethyl-4-hydroxyphenyl)fluorine.

Examples of the other bisphenols include 2,2'-bis(4-hydroxyphenyl)propane(bisphenol-A), 4,4'-(α-methylbenzylidene)bisphenol, bis(4-hydroxyphenyl)methane, 2,2'-bis (4-hydroxyphenyl)butane, 3,3'-bis(4-hydroxyphenyl) pentane, 4,4'-bis(4-hydroxyphenyl)heptane, 4,4'-bis(4-hydroxyphenyl)-2,5-dimethylheptane, bis(4- hydroxyphenyl)methylphenylmethane, bis(4-hydroxyphenyl)diphenylmethane, 2,2'-bis(4-hydroxyphenyl)octane, bis(4-hydroxyphenyl)octane, bis(4-hydroxyphenyl)-4-fluorophenylmethane, 2,2'-bis(3-fluoro-4-hydroxyphenyl)propane, bis(3,5-dimethyl-4-hydroxyphenyl)methane, 2,2'-bis(3,5-dimethyl-4-hydroxyphenyl)propane, bis(3,5-dimethyl-4-hydroxyphenyl)phenylethane, bis(3-methyl-4-hydroxyphenyl)diphenylmethane. These may be used alone or in combinations of two or more thereof.

The polycarbonates include polyester carbonates that use a small amount of an aliphatic and aromatic dicarboxylic acids as comonomers of the acid component in addition to the bisphenol component. Examples of aromatic dicarboxylic acids include terephthalic acid, isophthalic acid, p-xyleneglycol, bis-(4-hydroxyphenyl)-methane, 1,1'-bis(4-hydroxyphenyl)-ethane, 1,1'-bis(4-hydroxyphenyl)-butane, and 2,2'-bis(4-hydroxyphenyl)-butane. Among them, terephthalic acid and isophthalic acid are preferred.

The polycarbonate used preferably has a viscosity-average molecular mass of 2,000 to 100,000, more preferably a viscosity-average molecular mass of 5,000 to 70,000 and still more preferably a viscosity-average molecular mass of 7,000 to 50,000.

The specific viscosity measured at 20° C. in a methylene chloride solution with a concentration of 0.7 g/dL is preferably 0.07 to 2.70, more preferably 0.15 to 1.80 and still more preferably 0.20 to 1.30. The viscosity-average molecular mass less than 2,000 is inappropriate because the film obtained becomes brittle, where the viscosity-average molecular mass above 100,000 is unsuitable because the film is difficult to process.

Similarly to the polyester resin, a UV absorber can be added, as necessary, to the polycarbonate resin. A dry treatment and an adhesion facilitating treatment can be performed to increase adhesion to the polarizer.

Examples of methods suitable for manufacturing the film from the polycarbonate resin include a melt casting method, a melt extrusion method, and a calender method, and a method that ensures excellent thickness uniformity and causes no optical defects such as gel, strikes, fisheye, and scratches is preferred.

[Norbornene Resin]

The norbornene resins are resins having a norbornene backbone in repeating units, and those known resins disclosed in JP-A Nos. 3-14882 and 3-122137. In the present invention, these known norbornene resins can be suitably used and examples thereof include hydrogenation products of ring-opening polymers of norbornene group monomers, addition polymers of norbornene monomers, addition polymers of norbornene monomers with olefin monomers such as ethylene and/or α-olefins; addition polymers of norbornene monomers with cycloolefin monomers such as cyclopentene, cyclooctene, 5,6-dihydrodicyclopentadiene, and modification products of these polymers.

Examples of norbornene monomers include norbornene, 5-methyl-2-norbornene, 5-ethyl-2-norbornene, 5-butyl-2-norbornene, 5-ethylidene-2-norbornene, 5-methoxycarbonyl-2-norbornene, 5,5-dimethyl-2-norbornene, 5-cyano-2-norbornene, 5-methyl-5-methoxycarbonyl-2-norbornene, 5-phenyl-2-norbornene, 5-phenyl-5-methyl-2-norbornene, ethylene-tetracyclododecene copolymer, 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethyl-1,4:5,8-ethylidene-1,4,4a,5,6,7,8,8a-octahydronaphthalene, 6-chloro-1,4:5,8-dimethano-1,4,4a,5,6,7,8,8a-octahydronaphthalene, 6-cyano-1,4,5,8-dimethano-1,4,4a,5,6,7,8,8a-octahydronaphthalene, 6-pyridyl-1,4:5,8-dimethano-1,4,4a,5,6,7,8,8a-octahydronaphthalene, 6-methyloxycarbonyl-1,4,5,8-dimethano-1,4,4a,5,6,7,8,8a-octahydronaphthalene, 1,4-dimethano-1,4,4a,4b,5,8,8a,9a-otahydrofluorene, 5,8-methano-1,2,3,4,4a,5,8,8a-octahydro-2,3-cyclopentadienonaphthalene, 4,9:5,8-dimethano-3a,4,4a,5,8,8a,9,9a-octahydro-1H-benzoindene,4,11:5,10:6,9-trimethano-3a,4,4a,5,5a,6,9,9a,10,10a,11,11a-dodecahydro-1H-cyclopentaanthracene.

Polymerization of the norbornene monomers can be carried out by known methods and if necessary, the monomers can be copolymerized with other copolymerizable monomers or can be hydrogenated to produce hydrogenated norbornene polymers.

Furthermore, the polymers or hydrogenated polymers may be modified with α,β-unsaturated carboxylic acids and derivatives thereof, styrene hydrocarbons, organic silicone compounds having an olefinic unsaturated bond and hydrolyzable group or unsaturated epoxy monomers by the known methods.

The polymerization can be conducted by using Ir, Os, Ru trichloride hydrates, $MoC_{15}$, $WC_{16}$, $ReCl_5$, $(C_2H_5)_3Al$, $(C_2H_5)_3Al/TiCl_4(\pi-C_4H_7)_4Mo/TiCl_4$, $(\pi-C_4H_7)_4W/TiCl_4$, and $(\pi-C_3H_5)_3Cr/WCl_6$ as a polymerization catalyst.

As the the norbornene resin, "ZEONOR" and "ZEONEX", all of which are manufactured by ZEON Corporation and "ARTON" manufactured by JSR Corporation, "OPTOREZ" manufactured by Hitachi Chemical Co., Ltd., and "APEL" manufactured by Mitsui Sekiyu Kagaku Kogyo Kabushiki Kaisha are commercially available.

Similarly to the polyester resin, a UV absorber can be also added, if necessary, to the norbornene resin. A dry treatment and an adhesion facilitating treatment can be performed to increase adhesion to the polarizer.

—Method for Producing Norbornene Resin Film—

A norbornene resin film can be molded by a melt molding method. Examples of melt molding methods include a melt extrusion method such as a method using a T-die and an inflation method, a calender method, a hot press method, and an injection molding method. Among them, the melt extrusion method using a T-die is preferred because it ensures small thickness unevenness, enables processing to a thickness of about 50 μm to 500 μm, and can decrease the absolute value of retardation and the spread thereof.

The melt molding conditions are identical to those applied to a polycarbonate resin having about the same Tg. For example, with the melt extrusion method using a T-die, it is preferred that conditions be selected such that the pick-up roll have a comparatively high temperature of about 100° C. to 150° C. at a resin temperature of 240° C. to 300° C. and the resin be cooled gradually. Further, in order to reduce surface defects such as die lines, a structure is required such that the retention zone on the die be reduced to a minimum and it is preferred that absolutely no scratches or the like be present inside the die or at the lip.

If necessary, the surface accuracy of the sheets can be increased by polishing the surface thereof.

<Protective Film Demonstrating High Moisture Permeability>

In the liquid crystal display device in accordance with the present invention, at least one protective film of the polarizing plate on the backlight side, that is, the first polarizing plate, from among the first polarizing plate and second polarizing plate disposed at both sides of the liquid crystal cell, is introduced into the housing of the liquid crystal display device.

Therefore, this protective film is hardly affected by changes in the temperature and moisture environment. In order to reduce the production cost of the polarizing plates, it is preferred that a protective film that demonstrates a high moisture permeability (sometimes referred to hereinbelow as "film with a high moisture permeability") be used due to a high productivity thereof. More specifically, at least one protective film of the first polarizing plate preferably has a moisture permeability of more than 300 g/m²·day, more preferably 400 g/m²·day or more and still more preferably 600 g/m²·day or more at a temperature of 60° C. and a relative humidity of 95%.

Here it is preferred that a brightness enhancement film be disposed between the backlight and the first polarizing plate in the liquid crystal display device in accordance with the present invention. The brightness enhancement film converts the light from the backlight to a polarization state close to a linearly polarized light in the transmission axis direction of the polarizing plate, thereby increasing the light utilization efficiency of the backlight.

Therefore, it is preferred that the polarization state of the light that has been polarization-converted by the brightness enhancement film do not change when the light falls on the polarizer.

For this purpose, it is preferred that the in-plane retardation (Re) of the polarization film on the backlight side of the first polarizing plate be 10 nm or less and that thickness-direction retardation (Rth) be 60 nm or less.

Therefore, the polarization film on the backlight side of the first polarizing plate preferably satisfies at least any set of Formulas (I) and (II) and Formulas (III) and (IV) below.

In Formulas (I) to (IV) below, $Re_{(\lambda)}$ is the in-plane retardation value (nm) of the polarization film on the backlight side of the first polarizing plate at a wavelength λ (nm), and $Rth_{(\lambda)}$ is the thickness-direction retardation value (nm) of the polarization film on the backlight side of the first polarizing plate at a wavelength λ (nm).

$$0 \leq Re_{(630)} \leq 10 \quad \text{Formula (I)}$$

$$|Rth_{(630)}| \leq 25 \quad \text{Formula (II)}$$

$$|Re_{(400)} - Re_{(700)}| \leq 10 \quad \text{Formula (III)}$$

$$|Rth_{(400)} - Rth_{(700)}| \leq 35 \quad \text{Formula (IV)}$$

Any polarization film can be used as such polarization film with a high moisture permeability, provided that the above-described condition relating to moisture permeability is satisfied and the transmittance is 80% or more. Among the suitable films, a cellulose acylate film is especially preferred. Cellulose acylate will be described below in greater detail.

Basic principle of the method for synthesizing cellulose acylate that is a cellulose derivative used in accordance with the present invention is described in Migita et al. Wood Chemistry, p. 180-190 (Kyoritsu Shuppan Co., Ltd., 1968). A representative synthesis method is a liquid-phase acetylation method involving a carboxylic acid anhydride, acetic acid, and a sulfuric acid catalyst.

The cellulose derivative film used in accordance with the present invention is preferably composed of a cellulose derivative in which the polymer components constituting the film substantially have the above-described definition.

The term "substantially" as used herein means 55% by mass or more of the polymer components (preferably 70% by mass or more and still more preferably 80% by mass or more).

It is preferred that cellulose derivative particles be used as a starting material for film produced.

It is also preferred that 90% by mass or more of the particles used have a particle size of 0.5 mm to 5 mm.

It is further preferred that 50% by mass or more of the particles used have a particle size of 1 mm to 4 mm.

It is still further preferred that the cellulose derivative particles have a shape that is as close to spherical as possible.

The viscosity-average molecular mass of the cellulose derivative that is preferably used in accordance with the present invention is preferably 200 to 700, more preferably 250 to 550 and still more preferably 250 to 400, and still more preferably 250 to 350.

The viscosity-average molecular mass can be measured by a limiting viscosity method developed by Uda et al. (Kazuo Uda, Hideo Saito, Journal of the Society of Fiber Science and Technology, vol. 18, No. 1, p. 105-120, 1962). A measurement method described in detail in Japanese Patent Application Laid-Open (JP-A) No. 09-95538 may be also used.

The cellulose acylate used in accordance with the present invention preferably has a narrow molecular mass distribution of Mw/Mn (Mw is a mass-average molecular mass and Mn is a number-average molecular mass) determined by gel permeation chromatography. It is preferred that the range of Mw/Mn be 1.0 to 1.7, more preferably 1.3 to 1.65 and still more preferably 1.4 to 1.6.

[Production of Cellulose Acylate Film]

The cellulose acylate film is produced by a solvent casting method. With the solvent casting method, the film is produced by using a solution (dope) in which cellulose acylate is dissolved in an organic solvent.

The organic solvent for dissolving the cellulose derivative will be described below.

First, chlorine-containing solvents that can be advantageously used for producing a cellulose derivative solution will be described. The chlorine-containing solvent is not particularly limited, provided that the object thereof can be attained within a range in which a cellulose derivative can be dissolved and cast to form a film. The preferred examples of such chlorine-containing solvent are dichloromethane and chloroform. Dichloromethane is especially preferred. No particular problem is associated with mixing an organic solvent other than the chlorine-containing solvent. In this case, it is preferred that dichloromethane be used at a ratio of at least 50% by mass. Chlorine-free organic solvents that can be used are described below. Thus, the preferred chlorine-free organic solvent is selected from esters, ketones, ethers, alcohols, and hydrocarbons having 3 to 12 carbon atoms. Esters, ketones, ethers, and alcohols may have a cyclic structure.

Further, the alcohols that can be used together with the chlorine-containing solvents may have a linear structure, or a branched structure, or a cyclic structure, and among them, saturated aliphatic hydro carbons are preferred. Hydroxyl groups of the alcohols may be primary, secondary, or tertiary. Examples of suitable alcohols include methanol, ethanol, 1-propanol, 2-propanol, 1-butanol, 2-butanol, t-butanol, 1-pentanol, 2-methyl-2-butanol, and cyclohexanol. Fluoroalcohols can be also used as the alcohols. Suitable examples of fluoroalcohols include 2-fluoroethanol, 2,2,2-trifluoroethanol, and 2,2,3,3-tetrafluoro-1-propanol.

The hydrocarbons may have a linear structure, or a branched structure, or a cyclic structure, and either aromatic hydrocarbons or aliphatic hydrocarbons may be used. The aliphatic hydrocarbons may be saturated or unsaturated. Examples of suitable hydrocarbons include cyclohexane, hexane, benzene, toluene, and xylene.

Chlorine-free solvents are described below. In accordance with the present invention, the chlorine-free solvent is not particularly limited, provided that the object thereof can be attained within a range in which a cellulose derivative can be dissolved and cast to form a film. The preferred chlorine-free solvent is selected from esters, ketones, and ethers having 3 to 12 carbon atoms. Esters, ketones, and ethers may have a cyclic structure. Compounds having two or more of any of functional groups of esters, ketones, and ethers (that is, —O—, —CO—, and —COO—) also can be used as the main solvent. For example, other functional groups such as alcoholic hydroxyl groups may be also contained. In the case of a main solvent having functional groups of two or more kinds, the number of carbon atoms thereof may be within a stipulated range of compounds having any functional group. Examples of esters having 3 to 12 carbon atoms include ethyl formate, propyl formate, pentyl formate, methyl acetate, ethyl acetate, and pentyl acetate. Examples of ketones having 3 to 12 carbon atoms include acetone, methyl ethyl ketone, diethyl ketone, diisobutyl ketone, cyclopentanone, cyclohexanone, and methyl cyclohexanone. Examples of ethers having 3 to 12 carbon atoms include diisopropyl ether, dimethoxymethane, dimethoxyethane, 1,4-dioxane, 1,3-dioxanol, tetrahydrofuran, anisole, and phenetol. Examples of organic solvents having functional groups of two or more kinds include 2-ethoxyethyl acetate, 2-methoxyethanol, and 2-butoxyethanol.

The chlorine-free organic solvent for use in the cellulose derivative can be selected with consideration for a variety of the above-described issues. The preferred solvents are described below. Thus, the preferred solvent for the cellulose derivative is a mixed solvent containing three or more different solvents. The first solvent is at least one solvent selected from methyl acetate, ethyl acetate, methyl formate, ethyl formate, acetone, dioxolan, and dioxane or a mixture thereof The second solvent can be selected from ketones or acetoacetic esters having 3 to 7 carbon atoms, and the third solvent can be selected from alcohols or hydrocarbons having 1 to 10 carbon atoms, preferably from alcohols having 1 to 8 carbon atoms. When the first solvent is a mixture of two or more solvents, the second solvent may be omitted. It is still more preferred that the first solvent be methyl acetate, acetone, methyl formate, ethyl formate, or a mixture thereof. The second solvent is preferably acetone, methyl ethyl ketone, cyclopentanone, cyclohexanone, and methyl acetylacetate. A mixture of these solvents may be also used.

The cellulose derivative is dissolved in the organic solvent preferably to 10% by mass to 30% by mass, more preferably 13% by mass to 27% by mass, and especially preferably to 15% by mass to 25% by mass. A method for obtaining such concentration of the cellulose derivative may be implemented so that the predetermined concentration is obtained at a dissolution stage, or a low-concentration solution (for example, with a concentration of 9% by mass to 14% by mass) may be prepared in advance and then the solution with a predetermined high concentration may be prepared in a concentration process. Further, it is also possible to obtain a high-concentration cellulose derivative solution in advance and then add a variety of additives to obtain the cellulose derivative solution with a predetermined low concentration.

—Additives—

Various additives (for example, a plasticizer, a UV blocking agent, a deterioration inhibitor, an optical anisotropy control agent, fine particles, a peeling agent, a UV absorber, and the like) corresponding to the application of the cellulose acylate solution in accordance with the present invention can be added thereto at each preparation stage, and these additives may be solid or in the form of oily substances. Thus, the melting point or boiling point of the additives is not particularly limited. For example, a UV absorbing material can be mixed at 20° C. or more and 20° C. or less, or a plasticizer can be similarly mixed. Such mixtures are described, for example, in Japanese Patent Application Laid-Open (JP-A) No. 2001-151901. Examples of IR absorbing dyes are described in Japanese Patent Application Laid-Open (JP-A) No. 2001-194522. As for a period for adding these additives, they may be added at any stage of a dope fabrication process, but a process of adding the additives and preparing a mixture may be also added to the final preparation stage of the dope preparation process. The amount of each material to be added is not particularly limited, provided that the functions are demonstrated. When the cellulose acylate film is formed from many layers, the layers may differ in the kind and amount of the additives. Such structures are described, for example, in Japanese Patent Application Laid-Open (JP-A) No. 2001-151902 and represent the conventional well-known technology.

Materials that have heretofore been suggested can be used to decrease moisture permeability. Japanese Patent Application Laid-Open (JP-A) No. 2002-22956 describes a method for adding a polymerized plasticizer to cellulose acylate. Japanese Patent Application Laid-Open (JP-A) No. 2002-146044 describes a method that uses a rosin plasticizer. Japanese Patent Application Laid-Open (JP-A) No. 2001-343528 discloses a method that uses a hydrophobic plasticizer together with a deterioration inhibitor. Japanese Patent Application Laid-Open (JP-A) No. 2002-14230 discloses the use of a compound containing two or more aromatic rings. On the other hand, Japanese Patent Application Laid-Open (JP-A) No. 09-90101 suggests a method by which a substitution group of cellulose acylate is changed to a hydrophobic groups. Examples of specific materials are presented below, but the moisture permeability control agents that can be used in accordance with the present invention are not limited to the below-described materials.

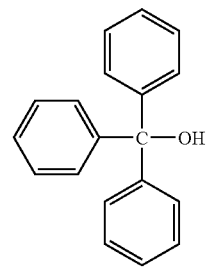

P-1

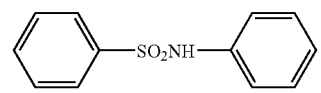

P-2

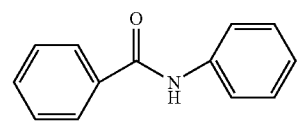

P-3

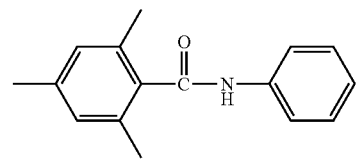

P-4

—Retardation Increasing Agent—

An aromatic compound having at least two aromatic rings can be used as a retardation increasing agent in order to increase retardation in the polarization film disposed on the side of the liquid crystal cell. An aromatic compound having at least two aromatic rings, for example, triazines (triphenyl-1,3,5-triazine, tri-m-tolyl-1,3,5-triazine, and the like), and diesters of trans-1,4-cyclohexanedicarboxylic acid (diester of p-n-hexylphenol, diester of p-n-amylphenol, and the like) can be used as the retardation increasing agent.

Other specific examples are described in JP-A Nos. 2000-111914 and 2000-275434 and also PCT/JP00/02619. Aromatic compounds of two or more kinds may be used together. The aromatic ring of the aromatic compounds may be not only an aromatic hydrocarbon ring, but also an aromatic hetero ring.

The molecular mass of the retardation increasing agent is preferably 300 to 800. When a cellulose acylate film is used as a polarization film on the cell side, the aromatic compound is used in an amount within a range of 0.01 parts by mass to 20 parts by mass per 100 parts by mass of cellulose acylate. It is more preferred that the aromatic compound be used in an amount within a range of 0.05 parts by mass to 15 parts by mass, still more preferably within a range of 0.1 parts by mass to 10 parts by mass per 100 parts by mass of cellulose acylate.

In the polarization film disposed on the side of the liquid crystal cell, the retardation can be also reduced with a well-known additive. For example, JP-A Nos. 11-246704, 11-92574, and 2000-63560 suggest to decrease a birefringence developing ability by specifying the type of the plasticizer to be added to the cellulose acylate film, and such reduction may be also used in accordance with the present invention.

Further it is also preferred that materials described in detail in pages 16 to 22 of Kokai Giho of Japan Institute of Invention and Innovation: (Kokai Giho No. 2001-1745, published on Mar. 15, 2001, Japan Institute of Invention and Innovation) be used.

The polarization film on the air side in accordance with the present invention requires the addition of a UV blocking agent, whereas the addition of a UV blocking agent is not necessary for the polarization film disposed on the side of the liquid crystal cell.

—Preparation of Dope—

A cellulose acylate solution (dope) can be prepared by a typical method involving the treatment at a temperature of 0° C. or higher (normal temperature or high temperature). The preparation of the solution can be implemented by using the dope preparation method and apparatus that are employed in the usual solvent casting method. In the case of the usual method, it is preferred that a halogenated hydrocarbon (in particular, methylene chloride) be used as the organic solvent.

The amount of cellulose acylate is adjusted to be 10% by mass to 40% by mass in the solution obtained. It is still more preferred that the amount of cellulose acylate be 10% by mass to 30% by mass. Any of the below-described additives may be added to the organic solution (main solution).

The solution can be prepared by stirring cellulose acylate with the organic solution at normal temperature (0° C. to 40° C.). A high-concentration solution may be stirred under pressurizing and heating conditions. More specifically, cellulose acylate and the organic solvent are introduced and sealed in a pressurizable container and stirred, while heating under pressure to a temperature within a range from a temperature equal to or higher than the boiling point of the solvent at normal temperature to a temperature at which the solvent does not boil. The heating temperature is usually 40° C. or higher, preferably 60° C. to 200° C., and more preferably 80° C. to 110° C.

The components may be introduced into the container after coarse premixing. They may also be charged into the container sequentially.

The container is required to be configured so as to enable stirring. The container can be pressurized by introducing an inactive gas such as nitrogen thereinto. The increase in vapor pressure of the solvent caused by heating may be also used, or the components may be added under pressure after the container has been sealed.

In the case of heating, the heating is preferably carried out from outside the container. For example, a jacket-type heating device can be used. It is also possible to provide a plate heater outside the container and heat the entire container by circulating liquid via piping.

A stirring blade may be provided inside the container and stirring may be performed by using the blade. The stirring blade preferably has a length such that the blade reaches a vicinity of the container wall. A scribing vane is preferably provided at the end of the stirring blade in order to renew the liquid film on the container wall.

Measuring instruments such as a manometer and a thermometer may be disposed in the container. The components are dissolved in the solvent inside the container. The prepared dope is discharged from the container after cooling or discharged and then cooled with a heat exchanger or the like.

The solution can be also prepared by a cooling dissolution method. With the cooling dissolution method, cellulose acylate can be dissolved even in organic solvents in which the dissolution is difficult by the usual dissolution method. Even with the solvents that can dissolve cellulose acylate when the usual dissolution method is used, the effect obtained with the cooling dissolution method is that a homogeneous solution can be obtained at a higher rate. Therefore, the cooling dissolution method is preferably used when dissolution is performed only in a chlorine-free solvent.

With the cooling dissolution method, cellulose acylate is initially gradually added, under stirring, to the organic solvent at room temperature. The amount of cellulose acylate is preferably adjusted so that the content ratio thereof in the mixture be 10% by mass to 40% by mass. The amount of cellulose acylate is more preferably 10% by mass to 30% by mass. Any of the below-described additives may be further added to the mixture.

The mixture is then cooled to the temperature ranging from −100° C. to −10° C. (preferably from −80° C. to −10° C. and still more preferably from −50° C. to −20° C., and most preferably from −50° C. to −30° C.). The cooling is carried out, for example, in a dry ice—methanol bath (−75° C.) or in a cooled diethylene glycol solution (−30° C. to −20° C.). The mixture of the cellulose acylate and organic solvent is solidified by the cooling.

The cooling rate is preferably equal to or more than 4° C./min, more preferably equal to or more than 8° C./min, and most preferably equal to or more than 12° C./min. The higher is the cooling rate the better, but a theoretic upper limit therefor is 10,000° C./sec, the technological upper limit is 1000° C./sec, and the practical upper limit is 100° C./sec. The cooling rate is a value obtained by dividing the difference between the temperature at the time the cooling is started and the final cooling temperature by the time required to reach the final cooling temperature after the cooling has been started.

Where additional heating is performed at a temperature of 0° C. to 200° C. (preferably 0° C. to 150° C., more preferably 0° C. to 120° C., most preferably 0° C. to 50° C.), cellulose acylate is dissolved in the organic solvent. The temperature may be raised by allowing the solution to stay at room temperature or by heating in a hot bath. The heating rate is preferably equal to or more than 4° C. /min, more preferably equal to or more than 8° C./min, and most preferably equal to or more than 12° C. The higher is the heating rate the better, but a theoretic upper limit therefor is 10,000° C./sec, the technological upper limit is 1,000° C./sec, and the practical upper limit is 100° C./sec. The heater rate is a value obtained by dividing the difference between the temperature at the time the heating is started and the final heating temperature by the time required to reach the final heating temperature after the heating has been started.

A homogeneous solution is obtained in the above-described manner. When the dissolution is insufficient, the heating operation may be repeated. Whether the dissolution is sufficient can be determined by observing visually the solution appearance.

In order to avoid the admixture of moisture caused by condensation during cooling, it is preferred that a sealed container be used in the cooling dissolution method. Further, where the pressure is increased during cooling and reduced during heating in the cooling and heating operations, the dissolution time can be shortened. A pressure-resistant container is preferably used for carrying out the pressure increase and reduction operation.

According to the measurement results obtained by differential scanning calorimetry (DSC), in the 20% by mass solution obtained by dissolving cellulose acylate (acylation degree: 60.9%, viscosity-average molecular mass: 299) in methyl acetate by the cooling dissolution method, a pseudo phase transition point of a sol state and a gel state is present close to a temperature of 30° C. and a uniform gel state is assumed at below this temperature. Therefore, the solution has to be maintained at a temperature higher than the pseudo phase transition point, preferably at a temperature about 10° C. higher than the gel phase transition temperature. The pseudo phase transition point differs depending on the degree of acyl group substitution in the cellulose acylate, viscosity-average molecular mass, solution concentration, and organic solvent used.

—Casting—

A cellulose acylate film is produced by a solvent casting method from the prepared cellulose acylate solution (dope). The above-described retardation increasing agent is preferably added to the dope.

The dope is cast on a drum or band, and the solvent is evaporated to form a film. The concentration of the dope prior to casting is preferably adjusted so as to obtain the solid fraction of 18% to 35%. The surface of the drum or band is preferably finished to obtain a mirror-finish state. The dope is preferably cast on a drum or band with a surface temperature of 10° C. or less.

In accordance with the present invention, when the dope (cellulose acylate solution) is cast on a band, a process of drying substantially without blowing is carried out for 10 sec or more to 90 sec or less, preferably 15 sec or more to 90 sec or less in the first half of drying performed prior to peeling. When casting is performed on the drum, a process of drying substantially without blowing is carried out for 1 sec or more to 10 sec or less, preferably 2 sec or more to 5 sec or less in the first half of drying performed prior to peeling.

In accordance with the present invention, "drying performed prior to peeling" indicates a process performed after the dope has been coated on the band or drum and before the film is peeled off. Further, "the first half" indicates a process performed before half of the entire time from the dope coating to the peeling elapses. "Substantially without blowing" means that no air flow with a rate equal to or higher than 0.5 m/sec is detected at a distance of 200 mm or less from the band surface or drum surface.

The first half of drying performed prior to peeling is usually about 30 sec to 300 sec in the case of casting onto a band, and the drying without blowing is performed within 10 sec or more to 90 sec or less, preferably 15 sec or more to 90 sec or less within this interval. In the case of casing onto the drum, the first half of drying is usually about 5 sec to 30 sec, and the drying without blowing is performed within 1 sec or more to 10 sec or less, preferably 2 sec or more to 5 sec or less within this interval. The atmosphere temperature is preferably 0° C. to 180° C., more preferably 40° C. to 150° C. The operation of drying without blowing can be performed at any stage of the first half of drying prior to peeling, but it is preferably performed immediately after casting. Where the duration of drying without blowing is less than 10 sec, the additives are difficult to distribute uniformly within the film, and where this interval exceeds 90 sec, the film is peeled without sufficient drying and the surface state of the film is degraded.

Within the interval outside that of drying without blowing in the drying prior to peeling, the drying can be performed by blowing an inactive gas. The blowing temperature in this process is preferably 0° C. to 180° C., more preferably 40° C. to 150° C.

The drying methods in the solvent cast methods are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Application Publication (JP-B) Nos. 45-4554, and 49-5614, JP-A Nos. 60-176834, 60-203430 and 62-115035. Drying on the band or drum can be performed by blowing an inactive gas such as air, nitrogen and the like.

The film obtained can be peeled off from the drum or band and then further dried in a high-temperature air flow in which the temperature is changed gradually from 100° C. to 160° C. to evaporate the remaining solvent. This method is described in JP-B No. 05-17844. With this method, the time from casting to peeling can be shortened. In order to implement this method, it is necessary that the dope be gelled at the surface temperature of the drum or band during casting.

The film can be also obtained by casting two or more layers of the prepared cellulose acetyl solution (dope). In this case, the cellulose acetyl film is preferably produced by the solvent casting method. The dope is cast on a drum or band and the solvent is evaporated to form a film. The concentration of solid fraction in the dope prior to casting is preferably adjusted to a range of 10% to 40%. The surface of the drum or band is preferably finished to obtain a mirror-finish state.

When cellulose acetyl solutions for two or more layers are cast, it is possible to cast a plurality of cellulose acylate solutions and a film can be produced by casting and laminating solutions containing cellulose acylate from a plurality of casting nozzles provided with a spacing in the advance direction of the support body. For example, methods described in JP-A Nos. 61-158414, 01-122419, and 11-198285 can be used. Further, a film can be also obtained by casting a cellulose acetate solution from two casting nozzles. For example, methods described in JP-B No. 60-27562 and JP-A Nos. 61-94724, 61-947245, 61-104813, 61-158413, and 06-134933 can be used. It is also possible to use a method for casting a cellulose acylate film described in JP-A No. 56-162617 by which a flow of a high-viscosity cellulose acylate solution is enveloped by a low-viscosity cellulose acylate solution and the high- and low-viscosity cellulose acylate solutions are extruded at the same time.

A film can be also fabricated by using two casting nozzles, peeling a film molded on the support body with the first casting nozzle and performing second casting on the side that is in contact with the support body surface. An example of such method is described in JP-B No. 44-20235. In this method, the same cellulose acylate solution maybe used for casting, or different cellulose acylate solutions may be used. In order to impart a plurality of cellulose acylate layers with functions, the cellulose acylate solutions corresponding to these functions may be extruded from respective casting nozzles. Further, the cellulose acylate solution in accordance with the present invention can be also cast simultaneously with other functional layers (for example, an adhesive layer, a dye layer, an antistatic layer, an antihalation layer, a UV absorbing layer, and a polarization layer).

With the conventional monolayer liquid, a cellulose acylate solution having a high concentration and a high viscosity has to be extruded to obtain the necessary film thickness. In this case, the stability of cellulose acylate solution is often degraded, a solid substance is formed causing strike defects, and surface flatness is degraded. As a method for resolving these problems, it is possible to extrude high-viscosity solutions simultaneously on a support body by casting a plurality of cellulose acylate solutions from the casting nozzles. As a result, a film with improved flatness and excellent surface state can be fabricated. Moreover, using high-concentration cellulose acylate solutions makes it possible to reduce the drying load and increase the film production speed.

A plasticizer can be added to the cellulose acylate film to improve the mechanical strength of the film. Examples of the plasticizers include phosphoric esters and carboxylic esters. Examples of phosphoric esters include triphenyl phosphate (TPP) and tricresyl phosphate (TCP). Typical examples of carboxylic esters include phthalic esters and citric esters. Examples of phthalic esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of citric esters include o-acetyltriethyl citrate (OACTE) and o-acetyltributyl citrate (OACTB). Examples of the other carboxylic esters include butyl oleate, methylacetylricinoleate, dibutyl sebacate and various trimellitic esters. The plasticizers of phthalic esters (DMP, DEP, DBP, DOP, DPP, DEHP) are preferably used, and DEP and DPP are particularly preferred.

The amount of the plasticizer is in preferably 0.1% by mass to 25% by mass, more preferably 1% by mass to 20% by mass, and particularly preferably 3% by mass to 15% by mass, based on the amount of the cellulose acylate.

Deterioration inhibitors such as an oxidation inhibitor, peroxide decomposer, radical inhibitor, metal inactivating agent, oxygen scavenger, amine, can be also incorporated into the cellulose acylate film. The deterioration inhibitors are described in JP-A Nos. 3-199201, 5-1907073, 5-194789, 5-271471 and 6-107854. The amount of the deterioration inhibitor is preferably 0.01% by mass to 1% by mass, more preferably 0.01% by mass to 0.2% by mass, based on the amount of the solution (dope). When the amount of the deterioration inhibitor is less than 0.01% by mass, the deterioration inhibitor hardly gives the effect. When the amount is more than 1% by mass, the deterioration inhibitor may bleed out onto the film surface. Butyrated hydroxytoluene (BHT) and tribenzylamine (TBA) are particularly preferred as the deterioration inhibitors.

These processes of casting and stretching to drying may be carried out in the air atmosphere or in an inactive gas atmosphere, such as nitrogen atmosphere. A generally employed coiling machine can be used for producing the cellulose acylate film used in accordance with the present invention, and coiling can be performed by an appropriate coiling method such as a constant tension method, a constant torque method, a taper tension method, and a program tension control method with constant internal stresses.

—Surface Treatment of Cellulose Acylate Film—

The cellulose acylate film is preferably subjected to surface treatment. Specific examples of surface treatment methods include corona discharge treatment, glow discharge treatment, flame treatment, acid treatment, alkali treatment, and UV irradiation treatment. It is also preferred that an undercoat be provided as described in JP-A No. 07-333433.

From the standpoint of maintaining the film flatness, it is preferred that the temperature of the cellulose acylate in these treatments be equal to or less than Tg (glass transition temperature), more specifically equal to or less than 150° C.

When the film is used as a protective film of a polarizing plate, from the standpoint of bonding to the polarizer, it is especially preferred that cellulose acylate be subjected to acid treatment or alkali treatment, that is, saponification treatment.

The surface energy is preferably 55 mN/m or more, more preferably 60 mN/m or more and 75 mN/m or less.

A specific example of alkali saponification treatment is described below.

Alkali saponification treatment of a cellulose acylate film is preferably performed in cycles in which the film surface is immersed in an alkali solution, then neutralized with an acidic solution, washed with water and dried. Examples of suitable alkali solution include a potassium hydroxide solution and a sodium hydroxide solution. The normal concentration of hydroxide ions in the solution is preferably within a range of from 0.1 N to 3.0 N, more preferably 0.5 N to 2.0 N. The alkali solution temperature is preferably within a range of from room temperature to 90° C., more preferably within a range of from 40° C. to 70° C.

The surface energy of a solid body can be found by a contact angle method, a heat-of-wetting method, and an adsorption method, as described in "Basic and Applied Aspects of Wetting" (Realize Inc., published in Dec. 10, 1989). In the case of the cellulose acylate film in accordance with the present invention, the contact angle method is preferably used.

More specifically, two solutions with known surface energy are dropped onto a cellulose acylate film, an angle including the liquid drop, which is an angle formed by a tangent line drawn to the liquid drop and the film surface in the crossing point of the liquid drop surface and the film surface, is defined as a contact angle, and the surface energy of the film can be found by calculations.

The in-plane retardation Re of the film can be adjusted by stretching in the conveying direction and/or width direction in the film production process and imparting the cellulose acylate molecular chains with orientation.

The stretching can be uniaxial or biaxial. Biaxial stretching can be performed by a simultaneous biaxial stretching method and a sequential biaxial stretching method. From the standpoint of continuous production, the sequential biaxial stretching method is preferred. After the dope has been cast, the film is peeled off from the band or drum, stretched in the width direction (longitudinal direction), and then stretched in the longitudinal direction (width direction).

Methods for stretching in the width direction are described, for example, in JP-A Nos. 62-115035, 04-152125, 04-284211, 04-298310, and 11-48271. The film stretching is performed at normal temperature or under heating. The heating temperature is preferably equal to or lower than the glass transition temperature of the film. The film can be stretched by processing during drying, this method being especially effective when the remaining solvent is present. In the case of stretching in the longitudinal direction, for example, the film can be stretched by adjusting the speed of the film conveying rolls so that the film coiling speed is higher than the film peeling speed. In the case of stretching in the width direction, the film can be stretched by conveying the film, while holding the film in the lateral direction with a tenter and gradually expanding the tenter. The film can be also stretched by using a stretching machine (preferably uniaxial stretching using a long stretching machine) after the film has been dried. The film stretching ratio (the ratio of the increase in the film length obtained by stretching to the original length) is preferably within a range of 5% to 50%, more preferably 10% to 40% and still more preferably 15% to 35%. When the film is mainly stretched in the longitudinal direction, the stretching ratio in the longitudinal direction is 10% to 40%, more preferably 15% to 35%, and the stretching ratio in the width direction is −20% to 20%, preferably −10% to 10%.

Water permeability of a cellulose acylate film can be also decreased by treating the film at a high temperature and increasing the crystallization degree. The treatment has to be performed for a time and at a temperature such that no problems are associated with sublimation of low-molecular compounds and thermal decomposition of the cellulose acylate film itself. The treatment temperature is preferably 100° C. or more and 260° C. or less, more preferably 140° C. or more and 240° C. or less. The treatment time is preferably 5 min or more and 2 h or less, more preferably 10 min or more and 1 h or less.

—Hygroscopic Expansion Coefficient—

A hygroscopic expansion coefficient represents the variation in the length of sample when relative humidity changes under constant temperature. In order to prevent frame-like increase in transmissivity, it preferred that the hygroscopic expansion coefficient of the cellulose acylate film be $30 \times 10^{-5}$/% RH or less, more preferably $15 \times 10^{-5}$/% RH or less, and most preferably $10 \times 10^{-5}$/% RH or less. The smaller is the hygroscopic expansion coefficient, the better, and usually the value thereof is $1.0 \times 10^{-5}$/% RH or more.

A method for measuring the hygroscopic expansion coefficient is described below. A sample with a width of 5 mm and a length of 20 mm is cut out from a polymer film (phase difference plate), one end of the sample is fixed, and the sample is suspended under an atmosphere at a temperature of 25° C. and a relative humidity of 20% RH ($R_0$). A mass of 0.5 g is suspended at the other end, the sample is allowed to stay for 10 min, and the length thereof ($L_0$) is measured. Then, the humidity is changed to 80% RH ($R_1$) at the same temperature of 25° C., and the length ($L_1$) is measured. The hygroscopic expansion coefficient is calculated by the following formula. The measurements are preformed on 10 samples of the same material and an average value is found.

Hygroscopic expansion coefficient [/% RH]=$\{(L_1-L_0)/L_0\}/(R_1-R_0)$.

In order to decrease changes in dimensions caused by moisture absorption, it is preferred that the amount of residual solvent in the film production process be decreased and a free volume in the polymer film be reduced. A typical method for decreasing the amount of residual solvent involves drying for a long time at a high temperature, but if the drying period is too long, the productivity obviously drops. Therefore, it is preferred that the amount of residual solvent in the cellulose acylate film be within a range of from 0.01% by mass to 1% by mass, more preferably within a range of from 0.02% by mass to 0.07% by mass, and most preferably within a range of from 0.03% by mass to 0.05% by mass. By controlling the amount of residual solvent, it is possible to produce a polarizing plate having optical compensation ability at a low cost and with a high productivity.

The amount of residual solvent is measured with a gas chromatograph (GC18A, manufactured by Shimazu Corp.) by dissolving a predetermined quantity of sample in chloroform. With the solution casting method, the film is produced by using a solution (dope) of a polymer material in an organic solvent. As described hereinabove, drying in the solution casting method can be generally classified in drying on the drum (or band) surface and drying performed when the film is conveyed. In drying on the drum (or band) surface, the drying is preferably slowly performed at a temperature that does not exceed the boiling temperature of the solvent used (if the boiling point is exceeded, bubbles appear). Further, drying during film conveying is preferably performed at a glass transition temperature of the polymer material ±30° C., more preferably ±20° C.

<<Retardation of Protective Film>>

The in-plane retardation (Re) and thickness-direction retardation (Rth) of the protective film used in accordance with the present invention are defined by the following Equations (1) and (2), respectively.

$$Re=(nx-ny) \times d \qquad \text{Equation (1)}$$

$$Rth=\{(nx+ny)/2-nz\} \times d \qquad \text{Equation (2)}$$

In Equations (1) and (2), nx is a refractive index in the direction of a phase delay axis (direction in which the refractive index reaches maximum) within the film plane, ny is a refractive index in the direction of a phase advance axis (direction in which the refractive index reaches minimum) within the film plane, and d is a film thickness in nanometer units. In Equation (2), nz is a refractive index in the thickness direction of the film.

In accordance with the present invention, a protective film with any retardation value can be used as the protective film on the viewing side of the polarizing plate (second polarizing plate) of the viewing side.

On the other hand, the protective film disposed on the backlight side of the first polarizing plate preferably has an in-plane retardation (Re) of 10 nm or less and a thickness-direction retardation (Rth) of 60 nm or less.

It is still more preferred that the protective film disposed on the backlight side of the first polarizing plate satisfy the following Formulas (I) to (IV).

In Formulas (I) to (IV) below, $Re_{(\lambda)}$ is the in-plane retardation value (nm) of the polarization film disposed on the backlight side of the first polarizing plate at a wavelength λ (nm), and $Rth_{(\lambda)}$ is the thickness-direction retardation value (nm) of the polarization film disposed on the backlight side of the first polarizing plate at a wavelength λ (nm).

$$0 \leq Re_{(630)} \leq 10 \qquad \text{Formula (I)}$$

$$|Rth_{(630)}| \leq 25 \qquad \text{Formula (II)}$$

$$|Re_{(400)}-Re_{(700)}| \leq 10 \qquad \text{Formula (III)}$$

$$|Rth_{(400)}-Rth_{(700)}| > 35 \qquad \text{Formula (IV)}$$

On the other hand, the protective film disposed on the side of the liquid crystal cell has an optimum retardation value, as described below, corresponding to the application of the protective film.

The birefringence index (Δn:nx−ny) of the protective film is preferably within a range of from 0.00 μm to 0.002 μm.

The birefringence index {(nx+ny)/2−nz} in the thickness direction of the support body film and the opposite film is preferably within a range of from 0.00 to 0.04.

The thickness (dry thickness) of the transparent protective film is preferably 120 μm or less, more preferably 20 μm to 110 μm and still more preferably 40 μm to 100 μm. The intersection angle of the phase delay axis of the protective film and the absorption axis of the polarizer may assume any value, but an orientation angle of parallel disposition of the axis or 45°±20° is preferred.

<<Photoelasticity of Protective Film>>

The photoelasticity coefficient of the protective film used in accordance with the present invention is preferably $60\times10^{-8}$ cm$^2$/N or less, more preferably $20\times10^{-8}$ cm$^2$/N or less. The photoelasticity coefficient can be found with an ellipsometer.

<<Glass Transition Temperature of Protective Film>>

The glass transition temperature of the protective film used in accordance with the present invention is preferably 120° C. or more, more preferably 140° C. or more.

The glass transition temperature as mentioned hereinabove is found as an average value of the temperature at which a base line derived from glass transition of the film starts changing and the temperature at which it again returns to the base line when measurements are performed at a temperature rise rate of 10° C./min with a differential scanning calorimeter (DSC).

In addition to the aforementioned polarizer and protective film, the polarizing plate may also have a pressure-sensitive adhesive layer, a separator film, and a protective film as structural elements.

<<Process of Producing the Polarizing Plate>>

A process of producing the polarizing plate will be described hereinbelow.

The process of producing the polarizing plate in the invention preferably includes a swelling step, a dyeing step, a hardening step, a stretching step, a drying step, a protective film sticking step and a drying step after sticking.

The order of dyeing step, hardening step and stretching step may be arbitrarily changed. Alternatively, some of these steps may be effected at the same time in combination. Further, as disclosed in Japanese Patent No. 3331615, the hardening step is preferably followed by rinsing with water.

In the invention, it is particularly preferred that the swelling step, the dyeing step, the hardening step, the stretching step, the drying step, the protective film sticking step and the drying step after sticking be successively effected in this order. An on-line surface condition inspection step may be provided during or after these steps.

The swelling step is preferably effected with water alone. As disclosed in JP-A No. 10-153709, however, the substrate of polarizing plate may be swollen with an aqueous solution of boric acid to control the swelling thereof for the purpose of stabilizing the optical properties and preventing the occurrence of wrinkle of the substrate of polarizing plate on the production line.

The swelling temperature and time can be arbitrarily determined, but the swelling is preferably effected at a temperature of 10° C. to 60° C. for 5 seconds to 2,000 seconds.

The dyeing step may be carried out by a method disclosed in JP-A No. 2002-86554. The dyeing can be carried out not only by dipping but also by any other arbitrary methods such as spreading and spraying of iodine or a dye solution.

As disclosed in JP-A No. 2001-290025, a method may be used which includes dyeing while controlling the iodine concentration, the dyeing bath temperature and the stretching ratio in the bath and stirring the bath solution.

In the case where a high order iodine ion is used as a dichroic molecule, the dyeing step is preferably effected with a solution obtained by dissolving iodine in an aqueous solution of potassium iodide to obtain a high contrast polarizing plate. In this case, the aqueous solution of iodine-potassium iodide preferably has an iodine concentration of 0.05 g/l to 20 g/l, a potassium iodide concentration of 3 g/l to 200 g/l and a mass ratio of iodine to potassium iodide of 1 to 2,000. The dyeing time is preferably 10 seconds to 1,200 seconds and the dyeing solution temperature is preferably 10° C. to 60° C. More preferably, the iodine concentration is 0.5 g/l to 2 g/l, the potassium iodide concentration is 30 g/l to 120 g/l, the mass ratio of iodine to potassium iodide is 30 to 120, the dyeing time is 30 seconds to 600 seconds and the solution temperature is 20° C. to 50° C.

Further, as disclosed in JP-B No. 3145747, a boron compound such as boric acid and borax may be incorporated in a dyeing solution.

The hardening step is preferably carried out by dipping the polarizing plate material in a crosslinking agent solution or spreading the crosslinking agent solution over the polarizing plate material. Further, as disclosed in JP-A No. 11-52130, the hardening step may be effected batchwise in several portions.

As the crosslinking agent there may be used one disclosed in U.S. Reissued Pat. No. 232,897. As disclosed in JP-B No. 3357109, as a crosslinking agent there may be used a polyvalent aldehyde to enhance dimensional stability. However, boric acids are most preferably used.

In the case where boric acid is used as a crosslinking agent to be used at the hardening step, metal ions may be added to the aqueous solution of boric acid-potassium iodide.

As the metal ion, zinc chloride is preferably used. However, as disclosed in JP-A No. 2000-35512, a zinc salt such as zinc halide, zinc sulfate and zinc acetate may be used instead of the zinc chloride.

In the invention, a PVA film is preferably dipped in an aqueous solution of boric acid-potassium iodide having zinc chloride incorporated therein so as to be hardened.

The boric acid preferably has a concentration of 1 g/l to 100 g/l, and more preferably 10 g/l to 80 g/l. The iodide potassium preferably has a concentration of 1 g/l to 120 g/l, and more preferably 5 g/l to 100 g/l. The zinc chloride preferably has a concentration of 0.01 g/l to 10 g/l, and more preferably 0.02 g/l to 8 g/l. The hardening time is 10 seconds to 1,200 seconds and more preferably 30 seconds to 600 seconds. The hardening solution has a temperature of 10° C. to 60° C. and more preferably 20° C. to 50° C.

The stretching step is preferably carried out by a longitudinal monoaxial stretching method as disclosed in U.S. Pat. No. 2,454,515 or a tenter method as disclosed in JP-A No. 2002-86554.

The stretching ratio is preferably from 2 to 12 and more preferably 3 to 10.

The relationship between the stretching ratio and the thickness of raw fabric and polarizer is preferably (thickness of a polarizer having a protective film stuck thereto/thickness of a raw fabric)×(total stretching ratio)>0.17 as disclosed in JP-A No. 2002-040256.

Further, the relationship between the width of the polarizer which comes out of the final bath and the width of the polarizer at the time of sticking of protective film is preferably 0.80≦(width of a polarizer at the time of sticking of a protective film/width of the polarizer which comes out of the final bath)≦0.95 as disclosed in JP-A No. 2002-040247.

The drying step can be carried out by a method known in JP-A No. 2002-86554. However, the drying temperature is preferably 30° C. to 100° C. The drying time is preferably 30 seconds to 60 minutes.

Further, as disclosed in JP-B No. 3148513, heat treatment is preferably effected such that the underwater fading temperature reaches 50° C. or more. As disclosed in JP-A Nos. 7-325215 and 7-325218, the film is preferably aged in an atmosphere which is controlled in humidity and temperature.

The step of sticking protective film is a step of sticking two sheets of protective film to the respective side of the polarizer which has come out of the drying step.

A method is preferably used which includes supplying an adhesive shortly before sticking, and then sticking the polarizer and the protective film so as to be laminated by a pair of rolls.

As disclosed in JP-A Nos. 2001-296426 and 2002-86554, the water content in the polarizer during sticking is preferably adjusted to suppress the occurrence of record groove-shaped roughness attributed to the stretching of the polarizer. In the invention, a water content of 0.1% to 30% is preferable.

The adhesive with which the polarizer and the protective film are stuck to each other is not particularly limited. Examples of the adhesives include PVA resins (including modified PVA such as an acetoacetyl group, sulfonic acid group, carboxyl group, oxyalkylene group, etc.), and an aqueous solution of boron compound. Of these, the PVA resins are preferred.

The adhesive layer has preferably a thickness of 0.01 μm to 5 μm, more preferably 0.05 μm to 3 μm after drying.

In order to enhance the adhesion between the polarizer and the protective film, the protective film is preferably subjected to surface treatment so that it is hydrophilicized before bonding to the polarizer.

The surface treatment method is not particularly limited and may be appropriately selected depending on the purpose. Examples thereof include any known methods such as saponification using an alkaline solution and corona discharge.

An adhesive layer such as gelatin undercoat layer may be provided on the protective film which has been surface-treated.

As disclosed in JP-A No. 2002-267839, the contact angle of the surface of the protective film against water is preferably 50° or less.

The drying step after sticking may be effected according to the method disclosed in JP-A No. 2002-86554. However, the drying temperature is preferably 30° C. to 100° C. The drying time is preferably 30 seconds to 60 minutes.

Further, as disclosed in JP-A No. 7-325220, the film is preferably aged in an atmosphere which is controlled in temperature and humidity.

Referring to element content in the polarizer, the iodine content is preferably 0.1 g/m² to 3.0 g/m², the boron content is preferably 0.1 g/m² to 5.0 g/m², the potassium content is preferably from 0.1 g/m² to 2.0 g/m² and the zinc content is preferably from 0 g/m² to 2.0 g/m².

The potassium content may be 0.2% by mass or less as disclosed in JP-A No. 2001-166143.

The zinc content may be 0.04% by mass to 0.5% by mass as disclosed in JP-A No. 12-035512.

As disclosed in JP-B No. 3323255, in order to enhance the dimensional stability of the polarizing plate, an organic titanium compound and/or organic zirconium compound may be added at any of dyeing step, stretching step and hardening step. Alternatively, at least one compound selected from the group consisting of organic titanium compounds and organic zirconium compounds may be incorporated. Further, a dichroic dye may be added to adjust the hue of the polarizing plate.

<Properties of Polarizing Plate>

(1) Transmission and Polarization Degree

The single plate transmission of the polarizing plate is preferably 42.5% to 49.5% and more preferably 42.8% to 49.0%.

The polarization degree defined by the Equation (4) is preferably 99.900% to 99.999% and more preferably 99.940% to 99.995%.

The parallel transmission is preferably 36% to 42% and the perpendicular transmission is preferably 0.001% to 0.05%.

The ratio of dichroism defined by the Equation (5) is preferably 48 to 1,215 and more preferably 53 to 525.

$$\text{Polarization degree (\%)} = 100 \times \sqrt{\frac{\text{parallel transmission} - \text{perpendicular transmission}}{\text{parallel transmission} + \text{perpendicular transmission}}} \quad \text{Equation (4)}$$

$$\text{Ratio of dichroism } (Rd) = \frac{\log\left[\frac{\text{single plate transmission}}{100}\left(1 - \frac{\text{polarization degree}}{100}\right)\right]}{\log\left[\frac{\text{single plate transmission}}{100}\left(1 + \frac{\text{polarization degree}}{100}\right)\right]} \quad \text{Equation (5)}$$

The iodine concentration and the single plate transmission may fall within the range defined in JP-A No. 2002-258051.

The parallel transmission may have small wavelength dependence as disclosed in JP-A Nos. 2001-083328 and 2002-022950.

The optical properties of the polarizing plate aligned in crossed Nicols may fall within the range defined in JP-A No. 2001-091736. The relationship between parallel transmission and perpendicular transmission may fall within the range defined in JP-A No. 2002-174728.

As disclosed in JP-A No. 2002-221618, the standard deviation of parallel transmission every 10 nm at a wavelength of between 420 nm and 700 nm may be 3 or less and the minimum value of (parallel transmission/perpendicular transmission) every 10 nm at a wavelength of between 420 nm and 700 nm may be 300 or more.

The parallel transmission and perpendicular transmission of the polarizing plate at a wavelength of 440 nm, 550 nm and 610 nm may preferably fall within the range defined in JP-A Nos. 2002-258042 and JP-A-2002-258043.

(2) Durability (2-1) Wet Heat Durability

The change of transmission and polarization degree of the polarizing plate from before to after 500 hours storage in an atmosphere of 60° C. and 90% RH each are preferably 3% or less based on the absolute value, as disclosed in JP-A No. 2001-116922.

In particular, the change of transmission is preferably 2% or less based on the absolute value and the change of polarization degree is preferably 0.5% or less and preferably 0.2% or less based on the absolute value.

Further, as disclosed in JP-A No. 7-077608, the polarization degree and single plate transmission of the polarizing plate are preferably 95% or more and 38% or more respectively after allowed to stand at 80° C. and 90% RH for 500 hours.

(2-2) Dry Durability

The change of transmission and polarization degree of the polarizing plate between before and after 500 hours storage in a dry atmosphere at 80° C. are preferably 3% or less based on the absolute value.

In particular, the change of transmission is preferably 2% or less based on the absolute value and the change of polarization degree is preferably 0.5% or less and more preferably 0.2% or less based on the absolute value.

(2-3) Other Durability Properties

As disclosed in JP-A No. 06-167611, the shrinkage percentage of the polarizing plate after 2 hours of storage at 80° C. may be 0.5% or less.

Moreover, the laminate of polarizing plates disposed on the both sides of a glass sheet in crossed Nicols after 750 hours of storage in an atmosphere of 69° C. preferably exhibits x value and y value falling within the range defined in JP-A No. 10-068818.

Further, in the polarizing plate, the change of the ratio of spectrum intensity at 105 $cm^{-1}$ to at 157 $cm^{-1}$ by Raman spectroscopy after 200 hours of storage in an atmosphere of 80° C. and 90% RH may fall within the range defined in JP-A Nos. 8-094834 and 9-197127.

(3) Alignment Degree

The higher the alignment degree of the PVA is, the better are polarization properties. The order parameter value calculated by polarized Raman scattering or polarized FT-IR is preferably 0.2 to 1.0.

Further, as disclosed in JP-A No. 59-133509, the difference between the alignment coefficient of polymer segment in the total amorphous region of the polarizer and the alignment coefficient (0.75 or more) of molecules occupying the total amorphous region is preferably at least 0.15. As disclosed in JP-A No. 4-204907, the alignment coefficient of the amorphous region of the polarizer is preferably 0.65 to 0.85. The alignment degree of high order ions such as $I_3^-$ and $I_5^-$ is preferably 0.8 to 1.0 as an order parameter value.

(4) Other Properties

As disclosed in JP-A-2002-006133, the shrinking force of the polarizing plate in the direction along the absorption axis per unit width after heating at 80° C. for 30 minutes may be preferably 4.0 N/cm or less.

As disclosed in JP-A No. 2002-236213, when the polarizing plate is allowed to stand under a heating condition of 70° C. for 120 hours, the dimensional change may be within ±0.6% both in the direction along the absorption axis and the direction along the polarizing axis.

The water content of the polarizing plate is preferably 3% by mass or less as disclosed in JP-A No. 2002-090546.

Further, as disclosed in JP-A No. 2000-249832, the surface roughness of the polarizing plate in the direction perpendicular to the stretching axis is preferably 0.04 µm or less based on the central line-average roughness.

Moreover, as disclosed in JP-A No. 10-268294, the refractive index no of the polarizing plate in the direction along the transmission axis may be more than 1.6. Further, the relationship between the thickness of the polarizing plate and the protective film preferably falls within the range defined in JP-A No. 10-111411.

<Functionalization of Polarizing Plate>

The polarizing plate used in the invention is preferably used as a functionalized polarizing plate complexed with a wide viewing angle film of the liquid crystal display device, λ/4 plate used for a reflection type liquid crystal display device, an antireflection film for enhancing viewability of display, a brightness enhancement film or an optical film having a functional layer such as a hard coat layer, forward scattering layer and anti-glare layer. Particularly, in the present invention brightness enhancement film is preferably used in combination with the polarizing plate.

Figure 2B:
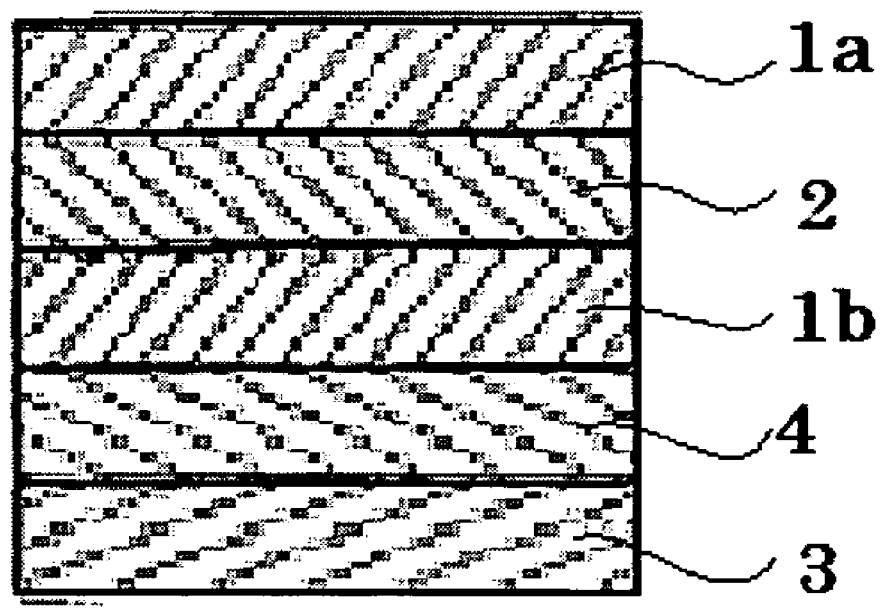
FIG. 2B is a cross-sectional view illustrating the configuration of a polarizing plate in an embodiment of the present invention.

As shown in FIG. 2B, the polarizing plate used in accordance with the present invention may be provided with protective films 1a, 1b on both surfaces of a polarizer 2, and a functional optical film 3 may be bonded via a pressure-sensitive adhesive 4.

It is also preferred to control the peel strength between the respective layers such as the functional optical film and the protective film at 4.0 N/25 mm or more as described in JP-A No. 2002-311238.

It is preferable that the functional optical film is disposed in the liquid crystal cell side or the side opposite to the liquid crystal cell, namely in the display side or the backlight side depending upon the desired function.

The functional optical film that is used in combination with the polarizing plate employed in the liquid crystal display device in accordance with the present invention will be described below.

(1) Brightness Enhancement Film

The polarizing plate used in the liquid crystal display device of the invention may be used in combination with a brightness enhancement film.

A brightness enhancement film acts to separate circular polarization or linear polarization. The brightness enhancement film is disposed interposed between the polarizing plate and the back light to cause back reflection or back scattering of one of circular or linear polarization toward back light.

The light reflected by the back light portion causes partial change of polarized state. When the light is again incident on the brightness enhancement film and the polarizing plate, it is partially transmitted thereby. By repeating this process, the percent utilization of light can be raised to raise the front brightness by a factor of about 1.4.

The brightness enhancement film has been known of anisotropic reflection system and anisotropic scattering system. Any of these systems of brightness enhancement film can be combined with the polarizing plate.

As the anisotropic reflection system of the brightness enhancement film, there has been known a brightness enhancement film containing a monoaxially-stretch film and an unstretched firm laminated in multilayer configuration and having an anisotropy in reflectance and transmission developed by raising the difference in refractive index between stretching directions. For example, a multilayer system using a principle of dielectric mirror (as disclosed in International Publication Nos. WO95/17691, WO95/17692, WO95/17699) and a cholesteric liquid crystal system (as disclosed in European Patent No. 606940A2, JP-A No. 8-271731) are known. As the multilayer system of the brightness enhancement film using a principle of dielectric mirror there is preferably used DBEF-E, DBEF-D or DBEF-M (manufactured by 3M Co., Ltd.). As the cholesteric liquid crystal system of brightness enhancement film, there is preferably used NIPOCS (manufactured by NITTO DENKO CORPORA- TION) in the invention. For the details of NIPOCS, reference can be made to Nitto Giho, vol. 38, No. 1, May 2000, pp. 19-21.

The polarizing plate used in the invention is preferably used in combination with a brightness enhancement film of an anisotropic scattering system obtained by monoaxially stretching a blend of a positive intrinsic birefringence polymer and a negative intrinsic birefringence polymer as disclosed in International Publication Nos. WO97/32223, WO97/32224, WO97/32225, WO97/32226, JP-A Nos. 9-274108 and 11-174231. As the brightness enhancement film of anisotropic scattering system, DRPF-H (produced by 3M Co., Ltd.) is preferably used.

The polarizing plate employed in the liquid crystal display device in accordance with the present invention and a brightness enhancement film are preferably employed in a mode in which the two are bonded via a pressure-sensitive adhesive or as an integral configuration in which one protective film of the polarizing plate serves as the brightness enhancement film.

When the brightness enhancement film is bonded to the polarizing plate via a pressure-sensitive adhesive, it is preferred that the polarization state obtained by polarization conversion with the brightness enhancement film substantially does not change before the light falls on the polarizer. For this purpose, it is preferred that the retardation of the protective film of the backlight side of the polarizing plate on the backlight side be as small as described hereinabove. Alternatively, it is preferred that the brightness enhancement film be directly bonded to the polarizer so as to serve as a protective film of the polarizing plate.

(2) Wide Viewing Angle Film

A polarizing plate used in the present invention can be used as a wide view film in combination with a display mode of a liquid crystal cell such as TN (Twisted Nematic), IPS (In-Plane Switching), OCB (Optically Compensatory Bend), VA (Vertically Aligned) and ECB (Electrically Controlled Birefringence).

(2-1) TN Mode

By using liquid crystal cells of an TN mode in the liquid crystal display in accordance with the present invention, it is possible to reduce the problems associated with light leak and the like and to provide an image display with a high display quality.

As the wide viewing angle film for the TN mode, it is preferred to use a combination with WV Film (manufactured by FUJIFILM Corporation) as described in Nihon Insatsu Gakkaishi, Vol. 36, No. 3 (1999), pp. 40-44, Monthly Display, August (2002), pp. 20-24, JP-A Nos. 4-229828, 6-75115, 6-214116 and 8-50206, etc.

A preferred configuration of the wide viewing angle film for TN mode is one in which an alignment layer and an optically anisotropic layer are provided in this order on a transparent polymer film.

Though the wide viewing angle film may be laminated on the polarizing plate via an adhesive and used, it is particularly preferable from the viewpoint of thinning that the wide viewing angle film is used while serving as one of the protective films of the polarizer as described in SID'00 Dig., p. 551 (2000).

The alignment layer can be provided by means such as a rubbing treatment of an organic compound (preferably a polymer), oblique vapor deposition of an inorganic compound, and formation of a micro group-containing layer.

Further, though an alignment layer which generates an alignment function by imparting an electric field, imparting a magnetic field or irradiating light, an alignment layer formed by a rubbing treatment of a polymer is particularly preferable. The rubbing treatment is preferably performed by rubbing the surface of a polymer layer by paper or a cloth several times in the fixed direction.

It is preferable that the direction of the absorption axis of the polarizer and the rubbing direction are substantially parallel to each other.

With respect to the kind of the polymer to be used in the alignment layer, polyimides, polyvinyl alcohol, polymers having a polymerizable group as described in JP-A No. 9-152509, and the like can be preferably used.

The thickness of the alignment layer is preferably 0.01 µm to 5 µm, and more preferably from 0.05 µm to 2 µm. The optically anisotropic layer preferably contains a liquid crystalline compound.

The liquid crystalline compound which is used in the invention particularly preferably contains a discotic compound (discotic liquid crystal).

The discotic liquid crystal molecule is a compound having a disc-like core portion from which side chains radially extend such as a triphenylene derivative represented by the following D-1. Also, in order to impart stability over time, it is preferred to further introduce a group which is reactive with heat, light, and the like. Preferred examples of the discotic liquid crystals are described in JP-A No. 8-50206.

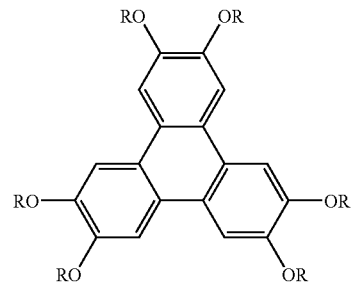

D-1

Discotic liquid crystal molecules are oriented substantially parallel to the film plane with a pretilt angle in the rubbing direction in the vicinity of the orientation layer, and on the opposite side of air surface, the discotic liquid crystal molecules are oriented so as to be almost perpendicular to the plane.

The discotic liquid crystal layer as a whole has a hybrid orientation, and a viewing angle expansion of a TFT-LCD of a TN mode can be realized with such layer structure.

In general, the optically anisotropic layer is obtained by coating a solution in which a discotic compound and other compound (additionally, for example, a polymerizable monomer and a photopolymerization initiator) dissolved in a solvent, on the alignment layer, drying, subsequently heating to the discotic nematic phase forming temperature, polymerizing upon irradiation with UV light, etc., and further cooling.

The discotic nematic liquid crystal phase-solid phase transition temperature of the discotic liquid crystalline compound which is used in the invention is preferably 70° C. to 300° C., and more preferably 70° C. to 170° C.

As the compound other than the discotic compound, which is added to the optically anisotropic layer, any compound can be used so far as it is compatible with the discotic compound and is able to impart a preferred change of the tilt angle to the liquid crystalline discotic compound, or it does not hinder the alignment. Examples thereof include polymerizable monomers (for example, compounds having a vinyl group, a vinyloxy group, an acryloyl group, or a metacryloyl group); and polymers such as cellulose acetate, cellulose acetate propionate, hydroxypropyl cellulose, and cellulose acetate butyrate which are additives for alignment control in the air interface side of fluorine-containing triazine compounds.

These compounds are generally used in the addition amount of 0.1% by mass to 50% by mass, and preferably 0.1% by mass to 30% by mass based on the discotic compound.

The thickness of the optically anisotropic layer is preferably 0.1 μm to 10 μm, and more preferably 0.5 μm to 5 μm.

The Re of optically anisotropic layer is preferably 10 nm to 100 nm, more preferably 20 nm to 70 nm and still more preferably 30 to 50 nm.

The front retardation value Re of the cellulose acylate film is preferably 0 nm to 50 nm and more preferably 2 nm to 30 nm.

The thickness-direction retardation value Rth of the cellulose acylate film is preferably 10 nm to 200 nm, and more preferably 30 nm to 150 nm.

A preferred embodiment of the wide viewing angle film is the wide viewing angle film contains a cellulose acylate film as the transparent substrate film, an alignment layer disposed thereon, and an optically anisotropic layer made of a discotic liquid crystal formed on the alignment layer, and the optically anisotropic layer is crosslinked upon irradiation with UV light.

Additionally, in the case of combining the wide viewing angle film with the polarizing plate, the wide viewing angle film can be preferably laminated with a phase difference plate having an optical axis in the direction intersecting with a plate face and showing anisotropy in birefringence as described in JP-A No. 7-198942; and the rates of dimensional change of the protective film and the optically anisotropic layer can be preferably made substantially equal to each other as described in JP-A No. 2002-258052.

The water content of the polarizing plate to be laminated with the wide viewing angle film can be preferably controlled at 2.4% or less as described in JP-A No. 2000-258632; and the contact angle of the surface of the wide viewing angle film against water can be preferably controlled at 70° or less as described in JP-A No. 2002-267839.

(2-2) OCB Mode

By using liquid crystal cells of an OCB mode in the liquid crystal display in accordance with the present invention, it is possible to reduce the problems associated with light leak and the like and to provide an image display with a high display quality.

The OCB mode is sometimes called a bend mode or a pixel mode due to the orientation state of liquid crystal molecules. The liquid crystal orientation state differs significantly between a mode without electric field application and when the electric field is OFF and ON. The orientation state of liquid crystal molecules in a liquid crystal cell when an electric field is applied is related to self-interacting optical compensation, and a viewing angle in this state is wide.

Another advantage is that the response speed is higher than that in other display modes. The problem is that black display is performed in the ON state. Therefore, an optical compensation layer has to be disposed.

The wide viewing angle film for a liquid crystal cell of the OCB mode is used for the purposes of performing vertical alignment in the center portion of the liquid crystal layer by applying an electric field and optically compensating the liquid crystal layer obliquely aligned in the vicinity of the interface of the substrate, thereby improving the viewing angle characteristic of black display.

In the case where the polarizing plate used in the invention is used in a liquid crystal cell of the OCB mode, the polarizing plate is preferably used in combination with a wide viewing angle film resulting from hybrid alignment of a disc-like liquid crystalline compound as described in U.S. Pat. No. 5,805,253.

The front retardation value Re of the cellulose acylate film to be used is preferably 10 nm to 100 nm and more preferably 20 nm to 70 nm. The thickness-direction retardation value Rth of the cellulose acylate film is preferably 50 nm to 300 nm, and more preferably 100 nm to 250 nm.

Re of optically anisotropic layers which is disposed on the cellulose acylate film is preferably 10 nm to 100 nm, more preferably 20 nm to 70 nm and still more preferably 25 to 40 nm.

(ECB Mode)

By using liquid crystal cells of an ECB mode in the liquid crystal display in accordance with the present invention, it is possible to reduce the problems associated with light leak and the like and to provide an image display with a high display quality.

An optical compensation film that produces a circularly polarized light is often employed in semi-transmissive liquid crystal display devices. In this case, the so-called λ/4 plate in which the in-plane retardation is ¼ of the light wavelength is suitable as the optical polarization film. There is an example of configuration in which the delay phase axes of the optical compensation film with a retardation of λ/4 and an optical compensation film serving as a λ/2 plate cross each other so that the aforementioned condition is satisfied in the entire visible light range (see JP-B No. 3236304).

The polarizing plate employed in accordance with the present invention can be used as a circular polarizing plate laminated with a λ/4 plate.

In order to obtain substantially complete circularly polarized light within the visible light wavelength range, the λ/4 plate used in the invention is preferably a phase difference film having a retardation (Re) of substantially ¼ of the wavelength within the visible light wavelength range.

The term "retardation of substantially ¼ within the visible light wavelength range" means that the longer the wavelength, the larger the retardation at the wavelength of 400 nm to 700 nm and shows the range which is satisfactory with the relationship that a in-plane retardation value ($Re_{(450)}$) as measured at a wavelength of 450 nm is from 80 nm to 125 nm, and a in-plane retardation value ($Re_{(590)}$) as measured at a wavelength of 590 nm is 120 nm to 160 nm. $Re_{(590)}-Re_{(450)} \geq 5$ nm is more preferable, and $Re_{(590)}-Re_{(450)} \geq 10$ nm is particularly preferable.

The λ/4 plate used in the invention is not particularly limited and may be appropriately selected depending on the purpose, as long as the above-described condition is satisfied. Examples of λ/4 plates include those known such as λ/4 plates made of a laminate of plural polymer films as disclosed in JP-A Nos. 5-27118, 10-68816, and 10-90521; λ/4 plates resulting from stretching a single polymer film as disclosed in International Publication Nos. WO 00/65384 and WO 00/26705; and λ/4 plates in which at least one optically anisotropic layer provided on a polymer film as disclosed JP-A Nos. 2000-284126 and 2002-31717 can be used. Moreover, the direction of the slow axis of the polymer film and the alignment direction of the optically anisotropic layer can be disposed in an arbitrary direction adaptive with the liquid crystal cell.

In the circular polarizing plate, though the slow axis of the λ/4 plate and the transmission axis of the above-described polarizer can be intersected with each other at an arbitrary angle, they are preferably intersected with each other at an angle within the range of 45°±20°. However, the slow axis of the λ/4 plate and the transmission axis of the polarizer may be intersected with each other at an angle falling outside the above range.

In the case where the λ/4 plate is comprised of a laminate of a λ/4 plate and a λ/2 plate, it is preferred to perform the lamination in such a manner that angles of the in-plane slow axes of the λ/4 plate and the λ/2 plate against the transmission axis of the polarizing plate are substantially 75° and 15° respectively as described in JP-B No. 3236304 and JP-A No 10-68816.

When the liquid crystal display device in accordance with the present invention is used as a transmission-type liquid crystal display device, it is preferred that a combination be employed with a viewing angle expansion film in which disk-shaped liquid crystal compounds are subjected to hybrid orientation. In this case, the in-plane retardation Re of the cellulose acylate film is preferably 0 nm to 300 nm, more preferably 0 nm to 200 nm. On the other hand, the thickness-direction retardation Rth of the cellulose acylate film is preferably 0 nm to 200 nm, more preferably 0 nm to 100 nm. Further, the in-plane retardation Re of the optically anisotropic layer is preferably 10 nm to 100 nm, more preferably 10 nm to 50 nm.

(2-4) VA Mode

By using liquid crystal cells of a VA mode in the liquid crystal display in accordance with the present invention, it is possible to reduce the problems associated with light leak and the like and to provide an image display with a high display quality.

The optical compensation film for a liquid crystal cell of the VA mode improves the viewing angle characteristic of black display in the state that liquid crystal molecules in the non-applied state of an electric field align vertically against the substrate face. Such a optical compensation film is preferably used in combination with a sheet having an in-plane phase difference close to 0 and having a phase difference in the thickness direction (see JP-B No. 2866372).

In order to optically compensate the liquid crystal molecules which are rod-like shaped and vertically aligned, disc-like compounds are preferably aligned in parallel to a substrate, for example, stretched films having the same in-plane retardation value are laminated and disposed such that the slow axes are crossed, a film is formed by coating a disc-like liquid crystal compound, and a sheet comprised of a rod-like compound similar to the liquid crystal molecules is laminated for the purpose of preventing deterioration of the perpendicular transmission in the oblique direction of the polarizing plate.

Further, the polarizing plate is configured as a plate in which the protective film of the polarizing plate is laminated on at least one side of a polarizer. A VA-type liquid crystal display device can be obtained by providing the polarizing plate thus obtained on one side or on both sides of a VA-type liquid crystal cell.

The protective film on the liquid crystal cell side of the polarizing plate used in the liquid crystal display device in accordance with the present invention may be used by itself as the optically anisotropic film. In this case, the front retardation value Re is preferably 20 nm to 100 nm, more preferably 30 nm to 70 nm. The thickness-direction retardation value Rth is preferably 50 nm to 250 nm, more preferably 80 nm to 170 nm.

By using a polarizing plate in which an optical film with a thickness-direction retardation value Rth within the aforementioned range is employed as the protective film of the polarizing plate, it is possible to obtain a good viewing angle characteristic in a VA-type liquid crystal display device.

In addition to the protective film on the liquid crystal cell side that has the above-described optical anisotropy, any phase difference film can be also used between the polarizing plate and the liquid crystal cell. The phase difference film is not particularly limited and may be appropriately selected depending on the purpose, but it is preferred that a phase difference film be used that is formed from a resin film such as a stretched norbornene resin film, polycarbonate resin film, polyamide, or polyester. The aforementioned combination is not particularly limited, but the preferred methods for producing a typical combination for obtaining good viewing angle characteristic when realizing optical anisotropy by employing only the protective film on the side of the liquid crystal cell involve producing a polarizing plate having a phase difference plate composed of cellulose acylate having the desired optical characteristic as the protective film on the liquid crystal cell side, this cellulose acylate film having a thickness of 40 μm to 100 μm and a degree of acyl substitution SA+SB satisfying the condition $2.3 \leq SA+SB \leq 2.8$, $0 \leq SB \leq 1.0$ and subjected to 10% to 35% stretching by the above-described method, and then bonding the polarizing plate to at least one side of a VA-mode liquid crystal cell with a pressure-sensitive adhesive. Examples of such methods include a method by which a polarizing plate having a protective film on the side of the liquid crystal cell that is obtained by stretching a cellulose acylate film with a degree of acyl substitution SA+SB satisfying the condition $2.3 \leq SA+SB \leq 2.6$, $0.5 \leq SB \leq 0.8$ is applied to both surfaces of a cell, and a method by which a polarizing plate having a protective film on the side of the liquid crystal cell that is obtained by stretching a cellulose acylate film with a degree of acyl substitution SA+SB satisfying the condition $2.3 \leq SA+SB \leq 3.0$, SB=0 is used for compensation at a backlight side of the cell.

Further, a method for using a phase difference plate other than the protective film on the side of the liquid crystal cell is known by which compensation is performed by providing a phase difference plate between a VA-mode liquid crystal cell and a polarizing plate, this phase difference plate being composed of at least one polymer selected from the group including polyamides, polyimides, polyesters, poly(ether ketones), poly(amidoimides), and poly(esterimides) and satisfying the condition nx>ny>nz, where nx and ny stand for refractive indexes in two in-plane directions and nz stands for a refractive index in the thickness direction.

(2-5) IPS Mode

By using liquid crystal cells of an IPS mode in the liquid crystal display in accordance with the present invention, it is possible to reduce the problems associated with light leak and the like and to provide an image display with a high display quality.

The wide viewing angle film for a liquid crystal cell of the IPS mode is used for optical compensation of liquid crystal molecules aligned in parallel to the substrate face and enhancement of the viewing angle characteristic of the perpendicular transmission of the polarizing plate at the time of black display in the non-applied state of an electric field.

The IPS mode becomes black display in the non-applied state of an electric field, and the transmission axes of a pair of vertical polarizing plates cross at right angles each other. However, in the case of observing obliquely, the cross angle between the transmission axes is not 90°, and leaked light is generated, whereby the contrast is lowered.

In the case where crystal cell of the IPS mode is used in the liquid crystal display device of the invention, in order to lower the leaked light, the polarizing plate is preferably used in combination with a wide viewing angle film having an in-plane phase difference close to 0 and having a phase difference in the thickness direction as described in JP-A No. 10-54982.

For example, a polarizing plate having a cellulose acylate film with Re within a range of from 0 nm to 100 nm and Rth within a range of from 0 nm to 200 nm as a protective film on the side of the liquid crystal cell can be used in combination with a phase difference plate with Re within a range of from 50 nm to 300 nm and Rth within a range of from 0 nm to 200 nm, or a polarizing plate having a protective film on the side of the liquid crystal cell in which an optically anisotropic layer is provided on a cellulose acylate film with Re within a range of from 0 nm to 100 nm and Rth within a range of from 0 nm to 200 nm can be used in combination with a phase difference plate with Re within a range of from 50 nm to 300 nm and Rth within a range of from 0 nm to 200 nm.

No specific limitation is placed on the polarizing plate used for optical compensation in the liquid crystal display devices of the IPS mode, but a polarizing plate containing a protective film on the side of a liquid crystal cell that has an additive decreasing the optical anisotropy of the cellulose acylate film, a front retardation of $|Re|\leq10$, and a thickness-direction retardation of $|Re|\leq25$, a polarizing plate containing a protective film on the side of a liquid crystal cell that is composed of a cellulose acylate film with a degree of acyl substitution SA+SB satisfying the condition $2.3\leq SA+SB\leq3.0$, $0\leq SB<1.0$ and a thickness of 40 μm to 80 μm, and a polarizing plate containing a protective film on the side of a liquid crystal cell in which the cellulose acylate film is stretched and has optical anisotropy can be advantageously used.

Further, these polarizing plates can be combined with a norbornene resin, a polycarbonate resin, or a phase difference plate obtained by coating a liquid crystalline compound on these resins.

A specific example is an embodiment in which a polarizing plate using Z-TAC (manufactured by FUJIFILM Corporation) as a protective film on the side of the liquid crystal side is pasted on the backlight side of the cell, a polarizing plate having a cellulose acylate film with a degree of acyl substitution satisfying the condition $2.3\leq SA+SB\leq2.5$, $0.8\leq SB\leq1.0$ and a thickness of 40 μm as a protective film on the side of the liquid crystal side is used on the viewer side, and a stretched norbornene film or polycarbonate film is provided between the polarizing plate and the liquid crystal cell.

In a compensation system, a phase difference plate obtained by stretching a norbornene film with a thickness of 80 μm to 100 μm and having Re of 100 nm to 250 nm and Rth of 50 nm to 150 nm is provided on the backlight side of the liquid crystal cell between a liquid crystal cell and a polarizing plate having a cellulose acylate film with $2.3\leq SA+SB\leq2.5$, $0.8\leq SB\leq1.0$ and a thickness of 40 μm as a protective film on the liquid crystal cell side, and a stretched polycarbonate phase difference plate with a thickness of 50 μm to 100 μm and having Re of 200 nm to 300 nm and Rth of 0 nm to 50 nm is provided on the viewer side between a liquid crystal cell and a polarizing plate having a cellulose acylate film with $2.3\leq SA+SB\leq2.5$, $0.8\leq SB\leq1.0$ and a thickness of 40 μm as a protective film on the liquid crystal cell side.

(3) Antireflection Film

The polarizing plate used in the invention can be used in combination with an antireflection film. As the antireflection film there may be used either a film having a reflectance of about 1.5% having only a single layer of a low refractive index material such as fluorine polymer provided thereon or a film having a reflectance of 1% or less utilizing multilayer interference of thin film. In the invention, a structure having a low refractive index layer and at least one layer having a higher refractive index than the low refractive index layer (i.e., high refractive index layer, middle refractive index layer) laminated on a transparent support is preferably used. Further, an antireflection film as disclosed in Nitto Giho, vol. 38, No. 1, May 2000, pp. 26-28 and JP-A No. 2002-301783, is preferably used as well. The refractive index of each layer needs to satisfy the following relationships.

Refractive index of high refractive index layer>refractive index of middle refractive index layer>refractive index of transparent support>refractive index of low refractive index layer As the transparent support used in the antireflection film, a transparent polymer film used in the protective film for the polarizing plate is preferably used.

The refractive index of the low refractive index layer is preferably 1.20 to 1.55 and more preferably from 1.30 to 1.50.

The low refractive index layer is preferably used as an outermost layer having scratch resistance and stainproofness. In order to enhance the scratch resistance of the low refractive index layer, a material containing a silicone group or fluorine is preferably used to render the surface of the low refractive index layer slippery.

As the fluorine-containing compound, compounds disclosed in paragraphs [0018] to [0026] of JP-A No. 9-222503, paragraphs [0019] to [0030] of JP-A No. 11-38202, paragraphs [0027] to [0028] of JP-A No. 2001-40284, and JP-A No. 2000-284102 are preferably used.

As the silicone-containing compound a compound having a polysiloxane structure is preferably used. However, a reactive silicone (for example, Silaplane (manufactured by Chisso Corporation), a polysiloxane containing a silanol group at both ends thereof (as disclosed in JP-A No. 11-258403), and the like may be used as well. An organic metal compound such as silane coupling agent and a silane coupling agent containing a specific fluorine-containing hydrocarbon group may be harden by condensation reaction in the presence of a catalyst (compounds as disclosed in JP-A Nos. 58-142958, 58-147483, 58-147484, 9-157582, 11-106704, 2000-117902, 2001-48590 and 2002-53804).

The low refractive index layer preferably contains as additives other than those described above a low refractive index inorganic compound having a primary particle diameter of 1 nm to 150 nm such as a filler (for example, silicon dioxide (silica), fluorine-containing particles (magnesium fluoride, calcium fluoride, barium fluoride), organic fine particles described in paragraphs [0020] to [0038] of JP-A No. 11-3820 and the like), a silane coupling agent, a lubricant, a surface active agent or the like.

The low refractive index layer may be formed by a gas phase method (e.g., vacuum deposition method, sputtering method, ion plating method, plasma CVD method). However, it is preferably formed by a coating method because it can be produced at reduced cost. Examples of the coating method include dip coating, air knife coating, curtain coating, roller coating, wire bar coating, gravure coating, and microgravure coating.

The thickness of the low refractive index layer is preferably 30 nm to 200 nm, more preferably 50 nm to 150 nm and most preferably 60 nm to 120 nm. The middle refractive index layer and the high refractive index layer is preferably configured to have an inorganic ultrafine particle compound having a high refractive index and an average particle diameter of 100 nm or less dispersed in a matrix material. As the inorganic ultrafine particle compound having a high refractive index, an inorganic compound having a refractive index of 1.65 or more such as oxides of Ti, Zn, Sb, Sn, Zr, Ce, Ta, La and In and composite oxides containing these metal atoms are preferably used.

These ultrafine particles may be subjected to surface treatment with a surface treatment agent (a silane coupling agent as disclosed in JP-A Nos. 11-295503, 11-153703 and 2000-9908, an anionic compound or organic metal coupling agent as disclosed in 2001-310432), may have a core-shell structure having a high refractive index particle as a core (as disclosed in JP-A No. 2001-166104) and may be used in combination with a specific dispersing agent (as disclosed in JP-A Nos. 11-153703, U.S. Pat. No. 6,210,858, JP-A No. 2002-277609).

As the matrix material any known thermoplastic resin, curable resin film or the like may be used. Moreover, a polyfunctional material as disclosed in JP-A Nos. 2000-47004, 2001-315242, 2001-31871 and 2001-296401 and a curable film obtained from a metal alkoxide composition disclosed in JP-A No. 2001-293818 may be used as well.

The refractive index of the high refractive index layer is preferably 1.70 to 2.20. The thickness of the high refractive index layer is preferably 5 nm to 10 µm, and more preferably 10 nm to 1 µm.

The refractive index of the middle refractive index layer is adjusted so as to be in between that of the low refractive index layer and the high refractive index layer.

The refractive index of the middle refractive index layer is preferably 1.50 to 1.70.

The haze of the antireflection film is preferably 5% or less and more preferably 3% or less. The strength of the antireflection film is preferably H or more, more preferably 2H or more and particularly preferably 3H or more according to pencil hardness test of JIS K5400.

(4) Other Functional Optical Films

The polarizing plate used in the invention is also preferably used in combination with a functional optical film having a hard coat layer, a front scattering layer, an anti-glare layer, a gas barrier layer, a slip layer, an antistatic layer, an undercoat layer, a protective layer or the like provided thereon. These functional layers are preferably complexed with the antireflection layer, the optically anisotropic layer or the like within the same layer.

(4-1) Hard Coat Layer

The polarizing plate used in the liquid crystal display device of the invention is preferably combined with a functional optical film having a hard coat layer provided on the surface of a transparent support to have a dynamic strength such as scratch resistance. In the case where the hard coat layer is applied to the antireflection film, the hard coat layer is particularly preferably provided between the transparent support and the high refractive index layer.

The hard coat layer is preferably formed by optical and/or thermal crosslinking reaction or polymerization reaction of a curable compound. As the curable functional group, a photopolymerizable functional group is preferably used. As the organic metal compound containing a hydrolyzable functional group, an organic alkoxysilyl compound is preferably used. Specific examples of the composition constituting the hard coat layer include those disclosed in JP-A Nos. 2002-144913 and 2000-9908 and International Publication No. WO00/46617.

The thickness of the hard coat layer is preferably 0.2 µm to 100 µm.

The strength of the hard coat layer is preferably H or more, more preferably 2H or more and particularly preferably 3H or more according to pencil hardness test of JIS K5400. The change of abrasion of the test specimen between before and after test according to Taber test of JIS K5400 is preferably as small as possible.

As the material forming the hard coat layer, a compound containing an ethylenically unsaturated group or a compound containing a ring-opening polymerizable group may be used. These compounds may be used singly or in combination. Preferred examples of the compound containing an ethylenically unsaturated group include polyol polyacrylates such as ethylene glycol diacrylate, trimethylolpropane triacrylate, ditrimethylolpropane tetraacrylate, pentaerythritol triacrylate, pentaerythritol tetraacrylate, dipentaerythritol pentaacrylate and dipentaerythritol hexaacrylate; epoxy acrylates such as diacrylate of bisphenol A diglycidyl ether and diacrylate of hexanediol diglycidyl ether; and urethane acrylate obtained by the reaction of polyisocyanate with hydroxyl group-containing acrylate such as hydroxyethyl acrylate. Examples of commercially available compounds include EB-600, EB-40, EB-140, EB-1150, EB-1290K, IRR214, EB-2220, TMPTA, TMPTA (manufactured by Daicel UCB Co., Ltd.), and UV-6300, UV-1700B (manufactured by Nippon Synthetic Chemical Industry Co., Ltd.).

Preferred examples of the compound containing a ring-opening polymerizable group include glycidylethers such as ethylene glycol diglycidyl ether, bisphenol A diglycidyl ether, trimethylolethane triglycidyl ether, trimethtylolpropane triglycidyl ether, glycerol triglycidyl ether, triglycidyl trishydroxyethyl isocyanurate, sorbitol tetraglycidyl ether, pentaerythritol tetraglycidyl ether, a polyglycidyl ether of a cresol novolac resin, a polyglycidyl ether of a phenol novolac resin; cycloaliphatic epoxy resin such as Celoxide 2021P, Celoxide 2081, Epolead GT-301, Epolead GT-401, EHPE3150CE (manufactured by DAICEL CHEMICAL INDUSTRY, CO., LTD.) and polycyclohexyl epoxymethyl ether of phenol novolac resin; and oxetanes such as OXT-121, OXT-221, OX-SQ and PNOX-1009 (manufactured by TOA-GOSEI CO., LTD.). Further, the hard coat layer may be formed of a glycidyl (meth)acrylate polymer or a copolymer of glycidyl (meth)acrylate polymer with a monomer copolymerizable therewith.

The hard coat layer preferably contains crosslinkable fine particles such as oxide fine particles (for example, silicon, titanium, zirconium, aluminum) and organic fine particles (for example, crosslinking particles such as polyethylene, polystyrene, poly(meth)acrylic acid ester and polydimethylsiloxane, crosslinkable rubber fine particles such as SBR and NBR) incorporated therein to reduce the cure shrinkage of the hard coat layer, enhance the adhesion of the hard coat layer to the substrate and reduce curling of the hard coat-processed product of the invention. The average particle diameter of these crosslinkable fine particles is preferably 1 nm to 20,000 nm. The shape of the crosslinkable fine particles may be sphere, rod, needle, plate or the like without any limitation. The amount of the fine particles to be used is preferably 60% by volume or less, more preferably 40% by volume or less based on the cured hard coat layer.

In the case where the inorganic fine particles are added, the inorganic fine particles are preferably subjected to surface treatment with a surface treatment agent containing a metal such as silicon, aluminum and titanium and having a functional group such as an alkoxide group, carboxylic acid group, sulfonic acid group and phosphonic acid group, because the inorganic fine particles has a poor affinity for the binder polymer.

The hard coat layer is preferably cured with heat or an active energy ray. Of the active energy ray, radiation, gamma ray, alpha ray, election ray and ultraviolet ray are more preferably used. Taking into account safety and productivity, electron ray and ultraviolet ray are particularly preferably used. In the case where the hard coat layer is thermally cured, the heating temperature is preferably 140° C. or less and more preferably 100° C. or less in view of the heat resistance of the plastic itself.

(4-2) Front Scattering Layer

The front scattering layer is used to improve the vertical and horizontal viewing angle characteristics (hue and brightness distribution) in the liquid crystal display device of the present invention. In the invention, a structure having fine particles having different refractive indexes dispersed in a binder is preferably used. For example, a structure having a specified front scattering coefficient as disclosed in JP-A No. 11-38208, a structure having a specified range of relative refractive index of transparent resin and fine particles as disclosed in JP-A No. 2000-199809 and a structure having a specified haze value of 40% or more as disclosed in JP-A No. 2002-107512 may be used.

Further, in order to control the viewing angle properties of haze of the polarizing plate used in the liquid crystal display device of the invention, the polarizing plate of the invention is preferably used in combination with "Lumisty" described in a technical report of Sumitomo Chemical Co., Ltd. "Optical Functional Film", pp. 31-39.

(4-3) Anti-Glare Layer

The anti-glare layer is used to scatter reflected light and prevent reflection. The anti-glare function can be obtained by forming roughness on the outermost surface (display side) of the liquid crystal display device. The haze of the optical film having an anti-glare function is preferably from 3% to 30%, more preferably from 5% to 20% and most preferably from 7% to 20%. The formation of roughness on the surface of the film may be preferably carried out, for example by a method which includes adding fine particles to the film to form roughness thereon (as disclosed in JP-A No. 2000-271878), a method which includes adding a small amount (0.1% by mass to 50% by mass) of relatively great particles (particle diameter of 0.05 μm to 2 μm) to the surface of the film to form surface roughness (as disclosed in JP-A Nos. 2000-281410, 2000-95893, 2001-100004 and 2001-281407) or a method which includes physically transferring roughness onto the surface of the film (e.g., embossing method as disclosed in JP-A Nos. 63-278839, 11-183710 and 2000-275401).

These functional layers may be each provided on either or both of the polarizer side and the opposite side of the polarizer.

As described hereinabove, in accordance with the present invention, there can be provided a liquid crystal display device that has high display quality and reduces the problem of light leak caused by changes in the temperature and moisture environment.

EXAMPLES

The present invention will be described below in greater detail based on examples thereof, but the modes for carrying out the present invention are not limited to these examples.

Example 1

<Fabrication of Protective Film with Low Moisture Permeability>

<<Preparation of Norbornene Resin Composition>>

8-Methyl-8-methoxycarbonyltetracyclo[4,4,0,12.5,17.10]dodeca-3-ene was dissolved in toluene and a solution with a concentration of 50% by mass was prepared. A total of 600 $cm^3$ of this toluene solution was charged into a 15 $dm^3$ autoclave that was completely purged in advance with ethene. The solution was saturated with ethene by pressurizing with ethene (ethylene) (6 bar) several times. A total of 10 $cm^3$ of a toluene solution of methylaluminoxane (toluene solution of methylaluminoxane with a concentration of 10% by mass having a molecular mass of 1300 g/mol; solidification point decrease was measured by cryoscopic determination) was weighed and the mixture was stirred for 30 min at 70° C.

A total of 0.37 mg of isopropylene(1-indenyl)(3-tert-butylcyclopentadienyl)zirconium dichloride was preliminary activated for 15 min in 10 $cm^3$ of toluene solution of methylaluminoxane and added to a reaction vessel.

Polymerization was then conducted for 1 h under stirring (750 rpm), and the ethene pressure was maintained at 6 bar by measuring the additional mass.

Once the reaction time has elapsed, the polymerized mixture was discharged into a container, acetone, 5 $dm^3$, was immediately introduced, stirring was performed for 10 min, and the precipitated product was filtered.

The filter cake was alternately washed three times with 10% hydrochloric acid and acetone, and the residue was converted into slurry in acetone and filtered again.

The polymer purified in the above-described manner was dried for 15 h at 80° C. under reduced pressure (0.2 bar). As a result, a colorless polymer, 40 g, was obtained. The polymer had a glass transition temperature of 142° C., a viscosity index of 185 mL/g, and a mass-average molecular mass of 147,000 g/mol.

<Fabrication of Norbornene Resin Film>

The norbornene polymer obtained in the above-described manner was dissolved in toluene to a concentration of 35% by mass, cast on a polyethylene terephthalate process film, and dried for 5 min at 80° C., for 5 min at 120° C., and then, after peeling from the process film, for 3 min at 150° C. to obtain a norbornene resin film. The thickness of the saturated norbornene resin film after drying was 60 μm.

<<Measurement of Moisture Permeability>>

The method for measuring moisture permeability may be based on the method described in "Polymer Physicality II, Polymer Experimental Course No. 4, Kyoritsu Shuppan Co., pp. 285-294, Measurement of Vapor Penetration Amount (mass method, temperature measurement method, vapor pressure method, adsorption measurement method)". In the present invention, moisture permeability was found under the measurement condition of temperature 60° C. and relative humidity 95% in accordance with JIS Z-0208. In this process, cups that were placed into a thermostat-hydrostat were taken out with appropriate intervals and weighed. The operations were repeated, the weight increase per unit time was found by two consecutive weighing, and the evaluation was continued till the weight increase became constant within 5%. In order to eliminate the effect of moisture absorption and the like on the sample, a blank cup containing no moisture absorbing agent was measured and the value of moisture permeability was corrected.

As a result, the moisture permeability of the fabricated norbornene resin film was 5 $g/m^2$ day.

<<Preparation of Coating Liquid for Undercoat Layer>>

The below-described composition was charged into a mixing tank and stirred under heating to dissolve the components and prepare a coating liquid for an undercoat layer.

| [Composition of Coating Liquid for Undercoat Layer] | |
| --- | --- |
| Styrene - butadiene latex (solids 43%) | 300 g |
| 2,4-Dichloro-6-hydroxy-s-triazine sodium salt (8%) | 49 g |
| Distilled water | 1,600 g |

<<Coating of Undercoat Layer>>

Both surfaces of the protective film with a low moisture permeability that was fabricated in the above-described manner were subjected to corona discharge treatment for 3 sec by using a high-frequency generator (Corona Generator HV05-2, Tamtec Co.) under the conditions of an output voltage of 100%, an output of 250 W, a wire with a diameter of 1.2 mm, an electrode length of 240 mm, and a distance between work electrodes of 1.5 mm. Surface modification was thus performed to obtain a surface tension of 0.072 N/m. The coating liquid for an undercoat layer was then coated to a dry thickness of 90 nm.

<<Coating of Hard Coat Layer and Low Refractive Index Layer>>

[Preparation of Sol Liquid 1]

A total of 187 g (0.80 mol) of acryloxypropyltrimethoxysilane, 27.2 g (0.20 mol) of methyltrimethoxysilane, 320 g (10 mol) of methanol, and 0.06 g (0.001 mol) of KF were charged into a reaction vessel with a capacity of 1,000 mL that was equipped with a thermometer, a nitrogen introducing tube, and a dropping funnel, and then 15.1 g (0.86 mol) of water was gradually dropwise added at room temperature under stirring.

After stirring for 3 h at room temperature upon completion of dropping, heating and stirring were conducted for 2 h under methanol refluxing. Then, low-boiling components were distilled out under reduced pressure and 120 g of sol liquid 1 was obtained by filtration.

The substance thus obtained was analyzed by GPC. The results demonstrated that a mass-average molecular mass was 1,500 and that from among the components with a molecular mass higher than that of the oligomer components, the components with a molecular mass of 1,000 to 20,000 took 30%.

The results of $^1$H-NMR measurements demonstrated that the structure of the substance obtained can be represented by the following general formula.

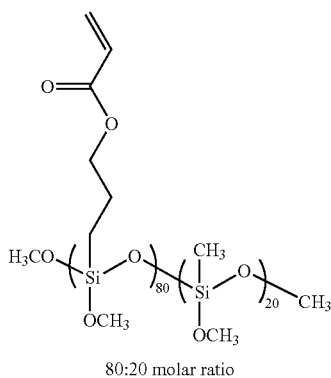

80:20 molar ratio

The condensation ratio α determined by $^{29}$Si-NMR measurements was 0.56. The analysis results confirmed that a linear chain structure portion constituted major portion of this silane coupling agent sol.

Gas chromatography analysis demonstrated that the retention ratio of the acryloxypropyltrimethoxysilane of the starting material was 5% or less.

<Preparation of Coating Liquid for Hard Coat>

The below-described components were charged into a mixing tank and stirred lo under heating to dissolve the components and prepare the coating liquid for a light scattering layer.

| [Composition of Coating Liquid for Light Scattering Layer] | |
| --- | --- |
| PET-30 | 40.0 g |
| DPHA | 10.0 g |
| Irgacure 184 | 2.0 g |
| SX-350 (30%) | 2.0 g |
| Crosslinked acryl - styrene particles (30%) | 13.0 g |
| FP-13 | 0.06 g |
| Sol liquid 1 | 11.0 g |
| Toluene | 38.5 g |

The coating liquid for a light scattering layer was filtered with a polypropylene filter with a pore diameter of 30 μm to prepare a coating liquid for a hard coat layer.

The compounds used for the coating liquids are listed below.

PET-30: mixture of pentaerythritol triacrylate and pentaerythritol tetraacrylate (manufactured by Nippon Kayaku KK).

Irgacure 184: polymerization initiator (manufactured by Chiba Specialty Chemicals Co., Ltd.)

SX-350: cross-linked polystyrene particles with a mean particle size of 3.5 μm [refractive index 1.60, manufactured by Soken Chemical Engineering Co., Ltd., 30% toluene dispersion, used after dispersing for 20 min at 10,000 rpm in a polytron dispersing machine].

Crosslinked acryl-styrene particles: mean particle size of 3.5 μm [refractive index 1.55, manufactured by Soken Chemical Engineering Co., Ltd., 30% toluene dispersion, used after dispersing for 20 min at 10,000 rpm in a polytron dispersing machine].

<<Preparation of Coating Liquid for Low Refractive Index>>

[Synthesis of Perfluoroolefin Copolymer (1)]

A total of 40 mL of ethyl acetate, 14.7 g of hydroxyethyl vinyl ether, and 0.55 g of dilauroyl peroxide were charged into an autoclave with an inner capacity of 100 mL that was equipped with a stainless steel stirrer, and the inside of the system was degassed and replaced with nitrogen gas. Then, 25 g of hexafluoropropylene (HFP) was introduced into the autoclave and the temperature was raised to 65° C. The pressure at a point in time in which the temperature inside the autoclave reached 65° C. was 0.53 MPa (5.4 kg/cm²). The temperature was maintained and the reaction was continued for 8 h, the heating was stopped at a point in time at which the pressure reached 0.31 MPa (3.2 kg/cm²), and the system was allowed to cool. When the internal temperature dropped to room temperature, the unreacted monomer was removed, the autoclave was opened, and the reaction liquid was taken out. The obtained reaction liquid was charged into a large excess of hexane and the solvent was removed by decantation to take out the precipitated polymer. The polymer was then dissolved in a small amount of ethyl acetate, and a reprecipitation from hexane was performed twice to remove completely the remaining monomers. A total of 28 g of polymer was obtained after drying.

A total of 20 g of the polymer was then dissolved in 100 mL of N,N-dimethylacetamide, and stirred for 10 h at room temperature after 11.4 g of acryloyl chloride was dropwise added under ice-cold conditions. Ethyl acetate was added to the reaction liquid, followed by washing with water, extraction of the organic layer, and concentration, and the obtained polymer was reprecipitated with hexane to obtain 19 g of perfluoroolefin copolymer (1) represented by the general formula below. The refractive index of the polymer obtained was 1.421.

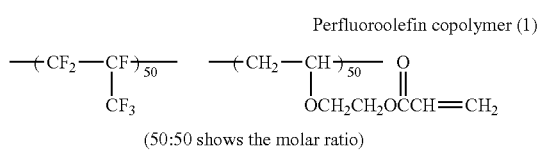

Perfluoroolefin copolymer (1)

(50:50 shows the molar ratio)

<Preparation of Sol Liquid 2>>

A total of 120 parts of methyl ethyl ketone, 100 parts of acryloyloxypropyltrimethoxysilane (KBM-5103, manufactured by Shin-Etsu Chemical Co., Ltd.), and 3 parts of diisopropoxyaluminum ethyl acetoacetate were added into a reactor equipped with a stirrer and a reflux cooler, the components were mixed, then 30 parts of ion-exchange water was added, and the reaction was conducted for 4 h at 60° C. Then, cooling to room temperature was preformed and sol liquid 2 was obtained. The mass-average molecular mass was 1,600, and from among the components with a molecular mass higher than that of the oligomer components, the components with a molecular mass of 1,000 to 20,000 took 100%. The analysis conducted by gas chromatography demonstrated that there was absolutely no remaining acryloyloxypropyltrimethoxysilane that was the starting material.

<<Preparation of Coating Liquid for Low Refractive Index Layer>>

A polysiloxane, 13 g of a thermally crosslinkable fluorine-containing polymer having a hydroxyl group and a refractive index of 1.44 (JTA113, concentration of solids 6%, manufactured by JSR Co., Ltd.), 1.3 g of colloidal silica dispersion MEK-ST-L (trade name, mean particle size 45 nm, concentration of solids 30%, manufactured by Nissan Chemical Co., Ltd.), 0.65 g of sol liquid 2, 4.4 g of methyl ethyl ketone, and 1.2 g of cyclohexanone were added, stirred, and then filtered through a polypropylene filter with a pore diameter of 1 μm to obtain a coating liquid 1 for a low refractive index layer. The refractive index of the layer formed with this coating liquid was 1.45.

<<Coating of Hard Coat Layer>>

The fabricated protective film with a low moisture permeability was uncoiled in a rolled state, and the coating liquid for a hard coat layer was coated by direct extrusion with a coater having a throttle die on the surface of a protective film of a polarizing plate located on a backup roll, this surface having no coat layer. The coating was performed at a conveying speed of 30 m/min, followed by drying for 15 sec at 30° C. and for 20 sec at 90° C. Then, UV irradiation at a radiation dose of 90 mJ/cm$^2$ was performed by using an air-cooled metal halide lamp with a power of 160 W/cm (manufactured by Eye Graphics Co., Ltd.) under nitrogen purging, the coating layer was cured, and an antiglare layer having a thickness of 6 μm and antiglare ability was obtained. Coiling was then performed and a protective film with a low moisture permeability provided with a hard coat layer was fabricated.

<<Coating of Low Refractive Index Layer>>

The fabricated protective film with a low moisture permeability provided with a hard coat layer was uncoiled in a rolled state, and the coating liquid for a low refractive index layer was coated by direct extrusion with a coater having a throttle die on the surface of a protective film of a polarizing plate located on a backup roll, this surface having the hard coat layer. Drying was then performed for 150 sec at 120° C. and then for 8 min at 140° C., UV irradiation at a radiation dose of 300 mJ/cm$^2$ was thereafter performed by using an air-cooled metal halide lamp with a power of 240 W/cm (manufactured by Eye Graphics Co., Ltd.) under an atmosphere with an oxygen concentration of 0.1% obtained by nitrogen purging, and a low refractive index layer with a thickness of 100 nm was obtained. Coiling was then performed and a protective film with a low moisture permeability having a low refractive index layer was fabricated.

<<Fabrication of Optical Compensation Film>>

[Fabrication of Cellulose Acylate Film]

The below-described composition was charged into a mixing tank and stirred under heating to dissolve the components and prepare a cellulose acetate solution. The below-mentioned cellulose acylate had a total degree of acyl substitution of 2.83, a total degree of acetyl substitution of 2.83, and a 6 position conversion of 0.90.

| [Composition of Cellulose Acetate Solution] | |
|---|---|
| Cellulose acylate | 100 parts by mass |
| Triphenyl phosphate (plasticizer) | 7.8 parts by mass |
| Biphenyldiphenyl phosphate (plasticizer) | 3.9 parts by mass |
| Dichloromethane (first solvent) | 293 parts by mass |
| Methanol (second solvent) | 71 parts by mass |
| 1-Butanol (third solvent) | 1.5 parts by mass |
| Retardation increasing agent M1 of the structural formula below | 0.56 parts by mass |
| Retardation increasing agent M2 of the structural formula below | 0.28 parts by mass |

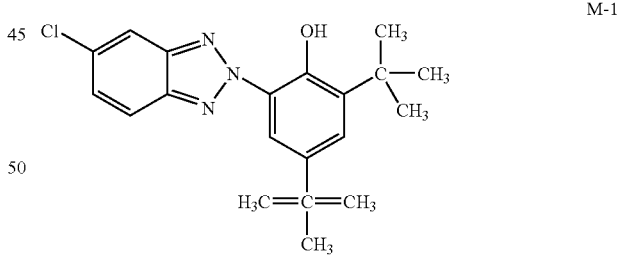

M-1

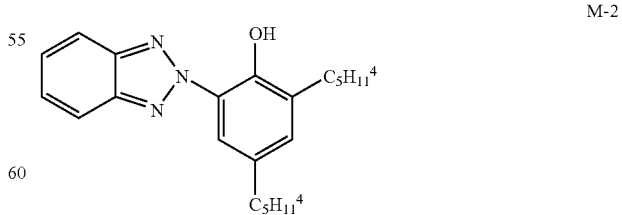

M-2

Solvents listed in the above-described composition table were mixed in a 400 L dissolution tank made from stainless steel, having a stirring impeller, and also having cooling water circulating on the outer circumference thereof, and then additives other than cellulose acylate were dissolved. The cellulose acylate powder was then gradually added under stirring to obtain a total mass of 300 kg. The content ratio of water in dichloromethane, butanol, and methanol, each serving as a solvent, was 0.2% by mass or less.

The tank was sealed, the temperature of the cooling water on the outer circumference of the tank was changed to 60° C., dissolution was performed for 2 h under stirring, and a cellulose acylate solution was prepared. The solution was filtered with a filter paper (#63, manufactured by Toyo Roshi KK) with an absolute filtration accuracy of 0.01 mm and then filtered with a filter paper (FH025, manufactured by Pall Corp.) with an absolute filtration accuracy of 2.5 μm.

<<Preparation of Second Solution>>

The below-described composition was charged into a mixing tank and stirred under heating to dissolve the components and prepare a second solution. Then, 25 parts by mass of the second solution and 474 parts by mass of the first solution (cellulose acetate solution) were mixed.

| [Composition of Second Solution] | |
| --- | --- |
| Fine particles (silicon dioxide (particle size 20 nm), Mohs hardness about 7) | 0.5 parts by mass |
| Methylene chloride | 87 parts by mass |
| Methanol | 13 parts by mass |

The obtained heterogeneous gel-like solution was pumped with a screw pump having an axial central portion heated to a temperature of 30° C., cooled from the outer circumferential portion of the screw and passed via the cooled portion so as to be maintained for 3 min at −75° C. The cooling was performed by using a coolant at −80° C. that was cooled in a refrigerator.

The solution thus obtained by cooling was heated to 35° C. during pumping with a screw pump and transported to a stainless steel container.

After a homogeneous solution has been obtained by stirring for 2 h at 50° C., the solution was filtered with a filter paper (#63, manufactured by Toyo Roshi KK) with an absolute filtration accuracy of 0.01 mm and then filtered with a filter paper (FH025, manufactured by Pall Corp.) with an absolute filtration accuracy of 2.5 μm.

The obtained cellulose derivative solution was heated to 110° C. at 1 MPa in a pressure section of a heating portion of a pumping pipe and discharged to a normal pressure (about 0.1 MPa), thereby evaporating the liquid solvent and cooling. As a result, a solution with a concentration of solids of about 24% at a temperature of 40° C. was obtained.

The dope prepared in the above-described manner was cast on a support body of a mirror-finished stainless steel band.

The film was peeled from the band, while being stretched to about 5% in the longitudinal direction, then dried while being stretched to 16% in the width direction in a tenter unit, dried, while being conveyed between multiple rolls, and coiled.

The fabricated film had a thickness of 70 μm, a thickness-direction retardation (Rth) of 200 nm, and an in-plane retardation (Re) of 55 nm. The moisture permeability of the optical compensation film thus obtained was 1,200 g/m²·day.

<<Fabrication of Polarizer>>

A poly(vinyl alcohol) film with a thickness of 120 μm was immersed into an aqueous solution containing 1 part by mass of iodine, 2 parts by mass of potassium iodide, and 4 parts by mass of boric acid and was fourfold stretched at a temperature of 50° C. to produce a polarizer.

<Fabrication of Polarizing Plate>

A total of 2 parts by mass of a hydrogenated block copolymer of maleic anhydride-modified styrene, butadiene, and styrene (melt index value 200° C., 1.0 g/10 min under a 5 kg load, styrene block content 30% by mass, hydrogen addition ratio 80% or more, maleic anhydride added quantity 2%) was dissolved in a mixed solvent containing 8 parts by mass of xylene and 40 parts by mass of methyl isobutyl ketone, and the solution was filtered with a polytetrafluoroethylene filter having a pore diameter of 1 μm to obtain a primer solution.

A first polarizing plate (polarizing plate on the backlight side) was then fabricated by pasting the surface of the saponified surface of the optical compensation film and the saponified surface of a triacetyl cellulose film (TAC-TD80U, manufactured by FUJIFILM Corporation) as protective films for both sides of the polarizer on the polarizer by using as an adhesive the primer solution prepared in the above-described manner.

Further, a second polarizing plate (polarizing plate on the viewing side) was then fabricated by pasting the surface of the protective film with a low moisture permeability that was subjected to corona treatment, without providing the hard coat layer, and the saponified surface of a triacetyl cellulose film (TAC-TD80U, manufactured by FUJIFILM Corporation) on the polarizer by using as an adhesive the primer solution prepared in the above-described manner.

A brightness enhancement film DRPF-H (manufactured by 3M Corp.) was pasted onto the polarizing plate on the backlight side via a pressure-sensitive adhesive.

The retardation of the triacetyl cellulose film (TAC-TD80U, manufactured by FUJIFILM Corporation) that was used in the above-described process was measured. The thickness-direction retardation (Rth) was 45 nm and the in-plane retardation (Re) was 3 nm. Further, the moisture permeability was 1,200 g/m²·day.

The polarizing plate and phase difference plate provided in a VA-type liquid crystal display device (LC-26GD3, manufactured by Sharp Corp.) were peeled off and the polarizing plate fabricated in the above-described manner was pasted.

The configurations of the protective films used in each polarizing plate in this process are described below. The polarizing plate on the viewing side of the liquid crystal cell used a norbornene resin film as a protective film on the viewing side, and the protective film on the liquid crystal cell side used an optical compensation film. The polarizing plate on the backlight side of the liquid crystal cell used a triacetyl cellulose film as a protective film on the backlight side and the optical compensation film as the protective film on the liquid crystal cell side.

<Evaluation of Light Leak (Evaluation of Peripheral Unevenness) After High-Moisture and Low-Moisture Treatment>

The fabricated liquid crystal display device was allowed to stay for 50 h at 60° C., and 90% RH and then for 24 h under an environment with 25° C. and 60% RH. The liquid crystal display device was then actuated in a black display mode and the light leak from the front surface was visually evaluated by a plurality of observers based on the following evaluation criteria. The evaluation results are shown in Table 1.

[Evaluation Criteria]

A: light leak was not observed.
B: light leak was present, but at a level causing no problem.
C: light leak was clearly observed.

[Evaluation of Contrast Ratio]

The brightness of white color display and the brightness of black color display on the front surface of the liquid crystal display device at the time the backlight was lighted were measured by using a brightness meter (BM-5A, manufactured by Topcon Co.), and the contrast ratio was calculated. The results obtained are shown in Table 1.

Example 2

<Fabrication of Low-Retardation Film>

<<Preparation of Cellulose Acetate Solution>>

The below-described composition was charged into a mixing tank and stirred to dissolve the components and prepare a cellulose acetate solution D.

| [Composition of Cellulose Acetate Solution D] | |
| --- | --- |
| Cellulose acetate with an acetylation degree of 2.86 | 100 parts by mass |
| Methylene chloride (first solvent) | 402.0 parts by mass |
| Methanol (second solvent) | 60.0 parts by mass |

<Preparation of Matting Agent Solution>

A total of 20 parts by mass of silica particles (AEROSIL R972, manufactured by Japan Aerosil Co., Ltd.) with a mean particle size of 16 nm and 80 parts by mass of methanol were mixed by thorough stirring for 30 min to obtain a dispersion of silica particles. The dispersion was charged together with the below-described composition into a dispersing apparatus and then stirred for 30 min or more to dissolve the components and prepare a matting agent solution.

| [Composition of Matting Agent Solution] | |
| --- | --- |
| Dispersion of silica particles with a mean particle size of 16 nm | 10.0 parts by mass |
| Methylene chloride (first solvent) | 76.3 parts by mass |
| Methanol (second solvent) | 3.4 parts by mass |
| Cellulose acetate solution D | 10.3 parts by mass |

<<Preparation of Additive Solution>>

The below-described composition was charged into a mixing tank and stirred while heating to dissolve the components and prepare an additive solution.

| [Composition of Additive Solution] | |
| --- | --- |
| Compound (M-3) decreasing optical anisotropy | 49.3 parts by mass |
| Wavelength dispersion controlling agent (M-4) | 7.6 parts by mass |
| Methylene chloride (first solvent) | 58.4 parts by mass |
| Methanol (second solvent) | 8.7 parts by mass |
| Cellulose acetate solution D | 12.8 parts by mass |

A total of 94.6 parts by mass of the cellulose acetate solution D, 1.3 parts by mass of the matting agent solution, and 4.1 parts by mass of the additive solution were mixed after filtering and cast by using a band casting machine. The mass ratios of the compound decreasing optical anisotropy and the wavelength dispersion controlling agent to the cellulose acetate in the above-described composition were 12% and 1.8%, respectively. A cellulose acylate film 1 was manufactured by peeling the film off the band at a residual solvent amount of 30% and drying for 40 min at 140° C. The residual solvent amount in the cellulose acylate film 1 thus obtained was 0.2% and the film thickness was 80 µm.

The $Re_{(630)}$ and $Rth_{(630)}$ of the low-retardation film thus obtained were 0.3 nm and 3.2 nm, respectively.

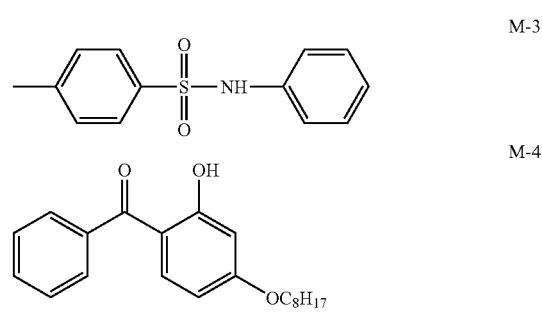

A polarizing plate was fabricated in the same manner as in Example 1, except that this low-retardation film was used for the protective film on the backlight side of the polarizing plate on the backlight side, and the polarizing plate produced was mounted on the liquid crystal display device and evaluated.

Example 3

<Fabrication of λ/4 Plate>

A total of 120 parts by mass of cellulose acetate with an average degree of acetylation of 55.0%, 9.36 parts by mass of triphenyl phosphate, 4.68 parts by mass of biphenyl diphenyl phosphate, 0.30 parts by mass of the below-described IR absorber, 543.14 parts by mass of methylene chloride, 99.35 parts by mass of methanol, and 19.87 parts by mass of n-butanol were mixed at room temperature to prepare a solution (dope).

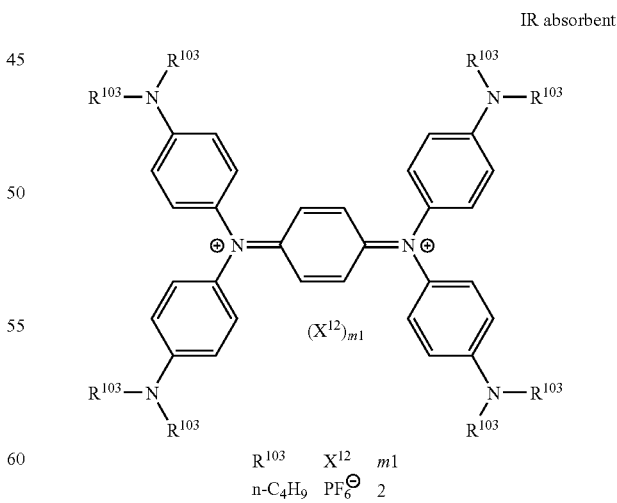

The dope obtained was cast on a glass plate, dried for 1 min at room temperature, and then dried for 5 min at 45° C. The residual amount of solvent after the drying was 30% by mass. The cellulose acetate film was separated from the glass plate and stretched uniaxially in the direction parallel to the casting direction at a temperature of 130° C. After the casting, the film was dried as is for 20 min at 120° C.

[Fabrication of Brightness Enhancement Film]

A poly(vinyl alcohol) layer with a thickness of 0.1 μm was provided on the λ/4 plate fabricated in the above-described manner, and an oriented film was formed by rubbing with a rayon cloth. A 20% by mass tetrahydrofuran solution of an acryl thermotropic cholesteric liquid crystal polymer was coated with a wire bar on the oriented film and dried. Then, thermal orientation treatment was performed for 5 min at a temperature of 150±2° C., followed by cooling at room temperature to form a cholesteric liquid crystal polymer layer with a thickness of 1 μm. This process produced a cholesteric liquid crystal layer that mirror-finish reflected right-handed circularly polarized light in a wavelength region demonstrating a circularly polarized light dichroism of (A) 350 nm to 450 nm.

Further, by repeating the orientation film formation, rubbing treatment, and liquid crystal polymer coating steps, a total of four cholesteric liquid crystal polymer layers that mirror-finish reflected the right-hand circularly polarized light in wavelength ranges (B) 450 nm to 55 nm, (C) 600 nm to 700 nm, and (D) 750 nm to 850 nm were laminated.

The moisture permeability of the brightness enhancement film that was thus fabricated was 700 g/m$^2$·day.

A polarizing plate was fabricated in the same manner as in Example 1, except that the brightness enhancement film fabricated in the above-described manner was used as the protective film on the backlight side of the first polarizing plate by directly pasting the λ/4 plate side thereof with a polarizer, and the polarizing plate thus produced was mounted on the liquid crystal display device and evaluated.

Example 4

A liquid crystal display device of Example 4 was fabricated in the same manner as in Example 1, except that TAC-TD80U was used as the protective film disposed on the viewing side of the second polarizing plate (opposite the protective film disposed between the polarizer and the liquid crystal cell in the polarizer of the second polarizing plate), and the protective film on the liquid crystal cell side was replaced with a norbornene resin film.

The light leak, front brightness, and front contrast ratio of the fabricated liquid crystal display device were measured and evaluated in the same manner as in Example 1. The evaluation results are shown in Table 1. Similarly to Example 1, a hard coat layer and an antireflection layer were provided on the protective film on the viewing side.

Example 5

A liquid crystal display device of Example 5 was fabricated in the same manner as in Example 1, except that the protective films on both sides of the polarizing plate on the viewing side in the configuration of Example 1 were replaced with norbornene resin films.

The light leak, front brightness, and front contrast ratio of the fabricated liquid crystal display device were measured and evaluated in the same manner as in Example 1. The evaluation results are shown in Table 1. Similarly to Example 1, a hard coat layer and an antireflection layer were provided on the protective film on the viewing side.

Example 6

<Fabrication of Vinylidene Chloride Resin Film>

<<Preparation of Coating Liquid for Coat Layer>>

The below-described composition was charged into a mixing tank and stirred under heating to dissolve the components and prepare a coating liquid for a coat layer.

| [Composition of Coating Liquid For Coat Layer] | |
|---|---|
| Chlorine-containing resin: R204 (manufactured by Asahi Chemical Life & Living Co., Ltd., "Salan Resin R204") | 12 g |
| Tetrahydrofuran | 63 g |

<<Coating of Coat Layer>>

The coating liquid for a coat layer was coated to obtain a thickness of 3 μm after drying by using a coater having a throttle die on a triacetyl cellulose film (TAC-TD80U, manufactured by FUJIFILM Corporation) with a thickness of 80 μm.

The coating was performed at a conveying speed of 30 m/min, and the coated film was dried for 5 min at 100° C. and coiled. The moisture permeability of the vinylidene chloride resin film fabricated in the above-described manner was 150 g/m$^2$·day.

The polarizing plate was mounted on a liquid crystal display device and evaluated in the same manner as in Example 2, except that the above-described vinylidene chloride resin film was used as a protective film on the viewing side of the polarizing plate on the viewing side. The evaluation results are shown in Table 1.

Example 7

<Fabrication of Film with Vinyl Alcohol Resin Coat Layer>

<<Preparation of Coating Liquid for Coat Layer>>

The below-described composition was charged into a mixing tank and stirred under heating to dissolve the components and prepare a coating liquid for a coat layer.

| [Composition of Coating Liquid for Coat Layer] | |
|---|---|
| Vinyl alcohol resin HR-3010 (manufactured by Kuraray Co., Ltd.) | 5 parts by mass |
| Mica ME-100 dispersed in water under high pressure (ratio of solid fraction is 5% by mass, manufactured by CO-OP Chemical Co., Ltd.) | 10 parts by mass |
| Water | 100 parts by mass |

Mica ME-100 was mixed with water to obtain a desired concentration and then was dispersed in water by three cycles of high-pressure dispersion treatment at 30 MPa by using a high-pressure dispersion machine. Resin HR-3010 was dissolved by stirring for 2 h in water at 95° C. The two were then mixed to prepare a coating liquid for a coat layer.

<<Coating of Coat Layer>>

The side of the triacetyl cellulose film (TAC-TD80U, manufactured by FUJIFILM Corporation) to be provided with a coat layer was subjected to saponification treatment at a temperature of 50° C. with a 1 mol/L alkali solution.

The coating liquid for a coat layer was then coated to obtain a thickness of 5 μm after drying on the saponified surface of the triacetyl cellulose film by using a coater having a throttle die. The coating was performed at a conveying speed of 30 m/min, and the coated film was dried for 5 min at 130° C. and coiled. The moisture permeability of the protective film thus obtained was 224 g/m²·day.

The polarizing plate was mounted on a liquid crystal display device and evaluated in the same manner as in Example 2, except that the above-described vinyl alcohol film for a coat layer was used as a protective film on the viewing side of the polarizing plate on the viewing side. The evaluation results are shown in Table 1. Similarly to Example 1, a hard coat layer and an antireflection layer were provided on the protective film on the viewing side.

Example 8

A polarizing plate was fabricated and mounted on a liquid crystal display device and the evaluation was performed in the same manner as in Example 1, except that the triacetyl cellulose film (TAC-TD80U, manufactured by FUJIFILM Corporation) used for the protective film on the backlight side of the polarizing plate on the backlight side of Example 1 was replaced with the optical compensation film (Re=55 nm, Rth=200 nm) fabricated in Example 1. The evaluation results are shown in Table 1. Similarly to Example 1, a hard coat layer and an antireflection layer were provided on the protective film on the viewing side.

Comparative Example 1

A polarizing plate was fabricated and a liquid crystal display device of Comparative Example 1 was fabricated in the same manner as in Example 1, except that the protective film on the liquid crystal cell side of the second polarizing plate (polarizing plate on the viewing side) in Example 1 was replaced with a triacetyl cellulose film (TAC-TD80U, manufactured by FUJIFILM Corporation). Then, the front brightness and contrast ratio of the liquid crystal display device of Comparative Example 1 were evaluated in the same manner as in Example 1. The evaluation results are shown in Table 1. Similarly to Example 1, a hard coat layer and an antireflection layer were provided on the protective film on the viewing side.

Comparative Example 2

A polarizing plate was fabricated and mounted on a liquid crystal display device and the evaluation was performed in the same manner as in Example 1, except that the triacetyl cellulose film (TAC-TD80U, manufactured by FUJIFILM Corporation) used for the protective film on the backlight side of the polarizing plate on the backlight side of Comparative Example 1 was replaced with the norbornene protective film fabricated in Example 1. The evaluation results are shown in Table 1. Similarly to Example 1, a hard coat layer and an antireflection layer were provided on the protective film on the viewing side.

Comparative Example 3

A polarizing plate was fabricated and mounted on a liquid crystal display device and the evaluation was performed in the same manner as in Example 1, except that the triacetyl cellulose film (TAC-TD80U, manufactured by FUJIFILM Corporation) used for the protective film on the liquid crystal cell side of the polarizing plate on the backlight side of Comparative Example 1 was replaced with the norbornene protective film fabricated in Example 1. The evaluation results are shown in Table 1. Similarly to Example 1, a hard coat layer and an antireflection layer were provided on the protective film on the viewing side.

Comparative Example 4

A polarizing plate was fabricated and mounted on a liquid crystal display device and the evaluation was performed in the same manner as in Example 1, except that the triacetyl cellulose film (TAC-TD80U, manufactured by FUJIFILM Corporation) used for the protective films on both sides of the polarizing plate on the backlight side of Comparative Example 1 were replaced with the norbornene protective films fabricated in Example 1. The evaluation results are shown in Table 1. Similarly to Example 1, a hard coat layer and an antireflection layer were provided on the protective film on the viewing side.

TABLE 1

|  | Moisture permeability (g/m² · day) | | | | | | |
|  | First polarizing plate (backlight side) | | Second polarizing plate (viewing side) | | | | |
|  | Protective film on backlight | Protective film on liquid | Protective film on liquid | Protective film on viewing | Light leak | Front brightness (cd/m²) | Front contrast ratio |
| --- | --- | --- | --- | --- | --- | --- | --- |
| Ex. 1 | 1,200 | 1,200 | 5 | 1,200 | A | 600 | 800 |
| Ex. 2 | 1,200 | 1,200 | 5 | 1,200 | A | 700 | 900 |
| Ex. 3 | 700 | 1,200 | 5 | 1,200 | A | 700 | 900 |
| Ex. 4 | 1,200 | 1,200 | 1,200 | 5 | A | 600 | 800 |
| Ex. 5 | 1,200 | 1,200 | 5 | 5 | A | 600 | 800 |
| Ex. 6 | 1,200 | 1,200 | 5 | 150 | A | 600 | 800 |
| Ex. 7 | 1,200 | 1,200 | 5 | 224 | A | 600 | 800 |
| Ex. 8 | 1,200 | 1,200 | 5 | 1,200 | A | 500 | 700 |
| Com. 1 | 1,200 | 1,200 | 1,200 | 1,200 | C | 600 | 800 |
| Com. 2 | 5 | 1,200 | 1,200 | 1,200 | C | 600 | 800 |
| Com. 3 | 1,200 | 5 | 1,200 | 1,200 | C | 600 | 800 |
| Com. 4 | 5 | 5 | 1,200 | 1,200 | C | 600 | 800 |

The results shown in Table 1 demonstrate that in Examples 1 to 8 in which a protective film with a high moisture permeability was employed for the protective film used in the first polarizing plate (polarizing plate on the backlight side) and a protective film with a low moisture permeability was employed for the protective film used in the second polarizing plate (polarizing plate on the viewing side), no peripheral light leak occurred and good front brightness and front contrast ratio were obtained. Therefore, high display quality as a liquid crystal display device was confirmed.

Especially good performance in terms of front brightness and front contrast was confirmed in Example 2 and Example 3 in which a protective film with a small retardation was employed for the protective film disposed between the polarizer and backlight in the first polarizing plate (polarizing plate on the backlight side).

On the other hand, in Comparative Examples 1 to 4 in which a protective film with a high moisture permeability was not employed for the protective film used in the first polarizing plate (polarizing plate on the backlight side) and a protective film with a low moisture permeability was not employed for the protective film used in the second polarizing plate (polarizing plate on the viewing side), peripheral light leak occurred and the front brightness and front contrast ratio deteriorated, and therefore the display quality as a liquid crystal display device was confirmed to be at a level allowing practical use.

What is claimed is:

1. A liquid crystal display device, comprising:
   a liquid crystal cell;
   a backlight;
   a first polarizing plate disposed between the liquid crystal cell and the backlight and having a polarizer and at least two protective films disposed so as to sandwich the polarizer; and
   a second polarizing plate disposed on a side of the liquid crystal cell opposite to a side on which the first polarizing plate is provided and having a polarizer and at least two protective films disposed so as to sandwich the polarizer,
   wherein a moisture permeability of the protective films on both sides of the first polarizing plate at a temperature of 60° C. and a relative humidity of 95% is more than 600 g/m$^2$·day, and a moisture permeability of at least one protective film of the second polarizing plate at a temperature of 60° C. and a relative humidity of 95% is equal to or less than 300 g/m$^2$·day.

2. The liquid crystal display device according to claim 1, wherein a brightness enhancement film is provided between the polarizer of the first polarizing plate and the backlight.

3. The liquid crystal display device according to claim 2, wherein the protective film disposed between the polarizer of the first polarizing plate and the backlight is the brightness enhancement film.

4. The liquid crystal display device according to claim 1, wherein the protective film disposed between the polarizer of the first polarizing plate and the backlight has an in-plane retardation (Re) of 10 nm or less at a wavelength of 630 nm, and a thickness-direction retardation (Rth) of 60 nm or less at a wavelength of 630 nm.

5. The liquid crystal display device according to claim 1, wherein the first polarizing plate is provided with at least one of a hard coat layer having hard coat ability and an antireflection layer.

6. A liquid crystal display device, comprising:
   a liquid crystal cell;
   a backlight;
   a first polarizing plate disposed between the liquid crystal cell and the backlight and having a polarizer and at least two protective films disposed so as to sandwich the polarizer; and
   a second polarizing plate disposed on a side of the liquid crystal cell opposite to a side on which the first polarizing plate is provided and having a polarizer and at least two protective films disposed so as to sandwich the polarizer,
   wherein a moisture permeability of the protective films on both sides of the first polarizing plate at a temperature of 60° C. and a relative humidity of 95% is more than 300 g/m$^2$·day, and a moisture permeability of at least one protective film of the second polarizing plate at a temperature of 60° C. and a relative humidity of 95% is equal to or less than 300 g/m$^2$·day, and
   wherein the protective film disposed between the polarizer of the first polarizing plate and the backlight satisfies the following Formulas (I) to (IV):

$$0 \leq Re_{(630)} \leq 10 \quad \text{Formula (I)}$$

$$|Rth_{(630)}| \leq 25 \quad \text{Formula (II)}$$

$$|Re_{(400)} - Re_{(700)}| \leq 10 \quad \text{Formula (III)}$$

$$|Rth_{(400)} - Rth_{(700)}| \leq 35 \quad \text{Formula (IV)}$$

in Formulas (I) to (IV) above, $Re_\lambda$ is a front retardation value (nm) at a wavelength $\lambda$(nm), and $Rth_\lambda$ is a thickness-direction retardation value (nm) at a wavelength $\lambda$(nm).

7. The liquid crystal display device according to claim 6, wherein a brightness enhancement film is provided between the polarizer of the first polarizing plate and the backlight.

8. The liquid crystal display device according to claim 7, wherein the protective film disposed between the polarizer of the first polarizing plate and the backlight is the brightness enhancement film.

9. The liquid crystal display device according to claim 6, wherein the first polarizing plate is provided with at least one of a hard coat layer having hard coat ability and an antireflection layer.

* * * * *